(12) United States Patent
Middleton et al.

(10) Patent No.: US 12,455,984 B2
(45) Date of Patent: Oct. 28, 2025

(54) MACHINE LEARNING FOR DATA ANONYMIZATION

(71) Applicant: Privacy Analytics Inc., Ottawa (CA)

(72) Inventors: Grant Howard George Middleton, Toronto (CA); Brian Joseph Rasquinha, Ontario (CA)

(73) Assignee: Privacy Analytics Inc., Ottawa (CA)

( * ) Notice: Subject to any disclaimer, the term of this patent is extended or adjusted under 35 U.S.C. 154(b) by 213 days.

(21) Appl. No.: 18/305,148

(22) Filed: Apr. 21, 2023

(65) Prior Publication Data

US 2024/0119175 A1    Apr. 11, 2024

Related U.S. Application Data

(60) Provisional application No. 63/333,908, filed on Apr. 22, 2022.

(51) Int. Cl.
G06F 21/62    (2013.01)

(52) U.S. Cl.
CPC .............................. G06F 21/6254 (2013.01)

(58) Field of Classification Search
CPC .................... G06F 21/6245; G06F 21/6254
See application file for complete search history.

(56) References Cited

U.S. PATENT DOCUMENTS

| | | | |
|---|---|---|---|
| 9,646,262 B2 | 5/2017 | Phillipps et al. | |
| 10,685,138 B2* | 6/2020 | Scaiano | G16H 10/60 |
| 11,574,186 B2* | 2/2023 | Iyoob | G06N 3/044 |
| 11,868,489 B2* | 1/2024 | Locher | G06F 21/604 |
| 2021/0049282 A1* | 2/2021 | Di Valentino | G06F 21/6254 |
| 2021/0110313 A1* | 4/2021 | Jones | G06F 18/2433 |
| 2021/0133557 A1* | 5/2021 | Iyoob | G06F 40/205 |
| 2022/0050917 A1* | 2/2022 | Jiang | G06F 21/577 |

OTHER PUBLICATIONS

International Preliminary Report on Patentability in International Appln. No. PCT/US2023/19445, mailed on Oct. 31, 2024, 10 pages.
Anonymizing Health Data: Case Studies and Methods to Get You Started, O'Reilly Media, Inc., Dec. 2013, (Abstract Only).

(Continued)

*Primary Examiner* — Tae K Kim
(74) *Attorney, Agent, or Firm* — Fish & Richardson P.C.

(57) ABSTRACT

Methods, systems, and apparatus, including computer programs encoded on computer storage media, for anonymizing unstructured data. In some implementations, a server can receive unstructured data. The server can automatically detect attributes in the unstructured data using a trained machine-learning model and can determine an amount of undetected attributes and detected attributes in the unstructured data. The server can simulate additional attributes for the unstructured data according to the amount of undetected attributes. The server can analyze a risk of disclosure in the unstructured data using the detected attributes and the simulated additional attributes. The server can modify the detected attributes according to the analyzed risk of disclosure and replace the detected attributes with the modified detected attributes in the unstructured data.

20 Claims, 7 Drawing Sheets

(56) References Cited

OTHER PUBLICATIONS

Barker, "Guideline for using cryptographic standards in the federal government: cryptographic mechanisms," National Institute of Standards and Technology, Special Publication 800-175B Revision 1, Mar. 2020, 91 pages.
Csrc.nist.gov [online], "NIST Policy on Hash Functions—Hash Functions | CSRC," Jan. 4, 2017, retrieved Jul. 7, 2023, retrieved from URL<http://web.archive.org/web/20190928164002/https://csrc.nist.gov/Projects/Hash-Functions/NIST-Policy-on-Hash-Functions>, 5 pages.
Dang, "Secure Hash Standard," Federal Information Processing Standards (NIST FIPS), Aug. 2015, retrieved on Jul. 6, 2023, retrieved from URL<https://www.nist.gov/publications/secure-hash-standard>, 36 pages.
Dankar et al., "Estimating the Re-identification Risk of Clinical Data Sets," BMC Medical Informatics & Decision Making, 2012, 12 (66): 1-15.
El Emam et al., "A Systematic Review of Re-identification Attacks on Health Data," PloS ONE, Dec. 2011, 6 (12):1-12.
El Emam et al., "De-identification Methods for Open Health Data: The Case of the Heritage Health Prize Claims Dataset," J. Med. Internet Res, Feb. 2012, 14 (1): 1-16.
Fortunebusinessinsights.com [online], "Natural Language Processing (NLP) Market Size, Share & COVID-19 Impact Analysis, By Deployment (On-Premises, Cloud, and Hybrid), By Enterprise Type (Small & Medium-sized Enterprises and Large Enterprises), By Technology (Interactive Voice Response, Optical Character Recognition, Text Analytics, Speech Analytics, Classification and Categorization, Pattern and Image Recognition, and Others), By Industry (Healthcare, Retail, High Tech and Telecom, Banking Financial Services, and Insurance, Automotive & Transportation, Advertising & Media, Manufacturing), and Regional Forecasts, 2022-2029," available on or before Oct. 28, 2022, via Internet Archive: Wayback Machine URL <http://web.archive.org/web/20221028123818/https://www.fortunebusinessinsights.com/industry-reports/natural-language-processing-nlp-market-101933>, retrieved Jul. 19, 2023, URL <https://www.fortunebusinessinsights.com/industry-reports/natural-language-processing-nlp-market-101933>, 9 pages.
International Search Report and Written Opinion in International Appln. No. PCT/US2023/19445, mailed on Jul. 17, 2023, 18 pages.
Nist.gov [online], "Guide for Conducting Risk Assessments," NIST Special Publication SP-800-30 Rev 1, Sep. 2012, retrieved on Jul. 7, 2023, retrieved from URL<http://www.nist.gov/manuscript-publication-search.cfm?pub_id=912091>, 95 pages.
Sweeney, "k-Anonymity: A Model for Protecting Privacy," International Journal on Uncertainty, Fuzziness and Knowledge-Based Systems, 2002, 10(5):557-570.
Xu et al., "Anonymizing Transaction Databases for Publication," Proceedings of the 14th ACM SIGKDD international conference on Knowledge discovery and data mining, Aug. 24, 2008, 767-775.

\* cited by examiner

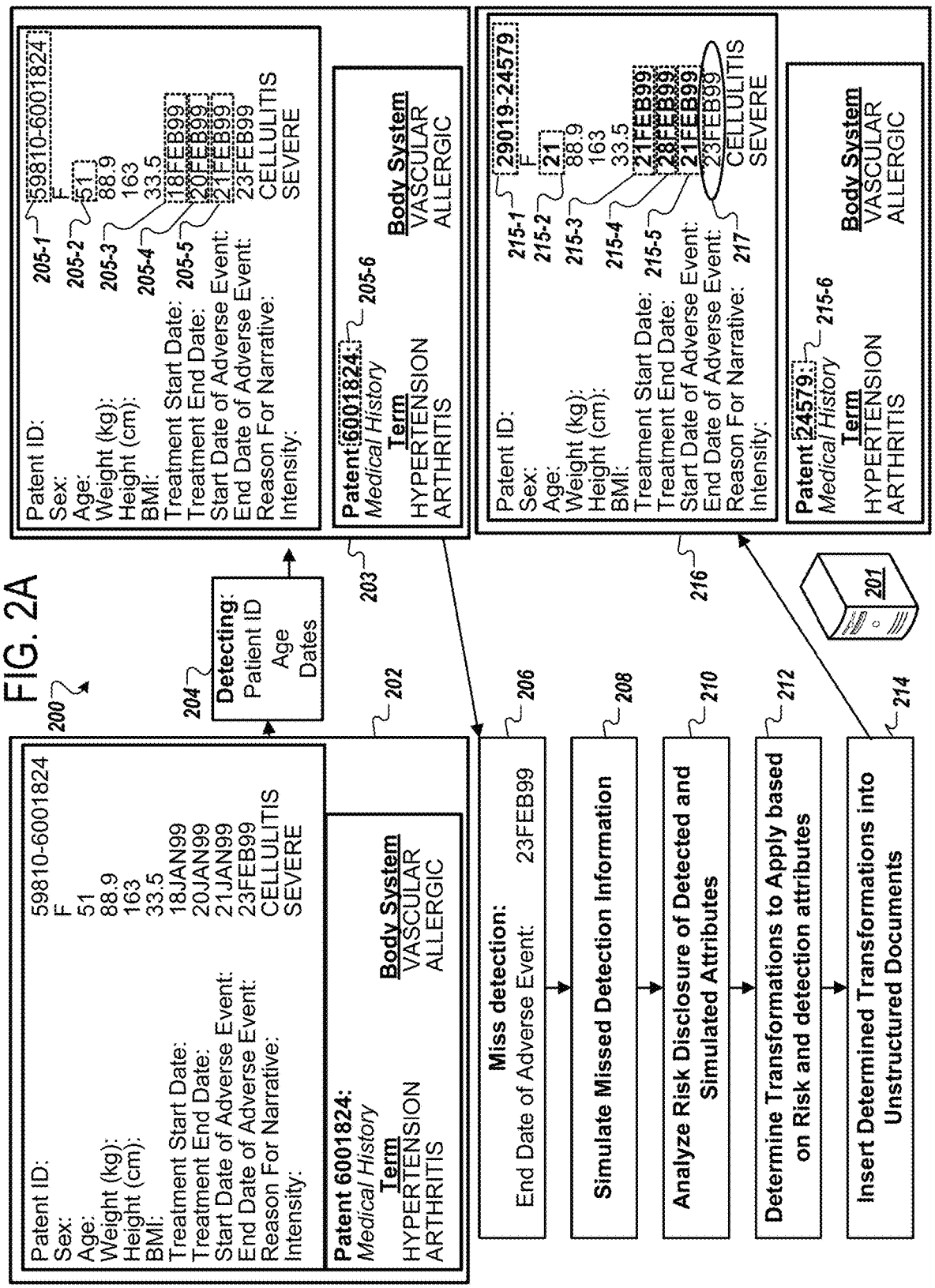

MACHINE LEARNING FOR DATA ANONYMIZATION

CROSS-REFERENCE TO RELATED APPLICATION

This application claims priority from and the benefit of U.S. Provisional Patent Application No. 63/333,908, titled "System and Method to Incorporate Disclosure Uncertainty to Anonymize Unstructured Information," and filed on Apr. 22, 2022, which is incorporated herein by reference in its entirety.

TECHNICAL FIELD

This specification generally relates to data anonymization, and one particular implementation relates to data anonymization using machine-learning models.

BACKGROUND

Data collection efforts, such as for clinical trials, can include processing data that includes personally identifiable information that can identify individuals. To protect such information and individual identities, techniques can be employed to securely anonymize and obfuscate the personally identifiable information.

SUMMARY

The subject matter of this application is related to anonymizing unstructured data. In some implementations, a system that includes one or more computers can detect the unstructured data and label personally identifiable information (PII) or attributes in the unstructured data using residual identifiers. The system can simulate undetected PII from the unstructured data in order to create statistically representative data that "fills in the gaps" of the detection process. By simulating undetected PII, the system can provide the detected PII and the simulated undetected PII to a risk disclosure model to assess the resulting disclosure impact. Based on the assessed risk of the detected PII and the undetected PII, the system can transform or synthesize replacements for the detected PII using various techniques. The transformed or resynthesized PII can then be reinserted into the unstructured data at the locations identified by the residual identifiers to mitigate disclosure impacts by way of data anonymization. The transformed or resynthesized PII inserted into the locations identified by the residual identifiers can reduce the overall risk of disclosure caused by the undetected PII.

By enabling data anonymization of unstructured data with auditable proof of efficacy and the ability to tailor the anonymization tools and approach, the system can ensure data defensibility while ensuring compliance considerations to ensure the risk of data disclosure has been appropriately mitigated by the anonymization. The disclosure risk can be measured, for example, by identification, attribution, and inferences, and ensure the use, sharing, or release of information from the unstructured data remains below a predefined threshold. Moreover, the system can simulate the undetected attributes, known to be in the unstructured data but difficult to detect to simplify the detection process, in order to better understand their contribution to disclosure risk. The system can transform or synthesize replacements for the detected attributes in the unstructured data based on a disclosure risk model incorporating detected attributes, uncertainty in the detection, and the undetected attributes.

In one general aspect, a method performed by one or more computing devices includes: receiving unstructured data; automatically, using a trained machine-learning model, detecting attributes in the unstructured data; determining an amount of undetected attributes and detected attributes in the unstructured data; simulating additional attributes for the unstructured data according to the amount of undetected attributes; analyzing a risk of disclosure in the unstructured data using the detected attributes and the simulated additional attributes; modifying the detected attributes according to the analyzed risk of disclosure; and replacing the detected attributes with the modified detected attributes in the unstructured data.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the unstructured data includes one or more of medical records, emails, presentations, textbooks, brochures, websites, documents, audio recordings, images, and videos.

In some implementations, the method includes: generating a machine-learning model that is configured to detect the attributes in the unstructured data, wherein generating the machine-learning model includes: training the machine-learning model to detect the attributes in a first subset of the unstructured data; determining a number of undetected attributes in the training of the machine-learning model; and retraining the machine-learning model to detect the attributes in the first subset of the unstructured data based on data indicative of the undetected attributes.

In some implementations, the method includes: determining the number of the undetected attributes in the first subset satisfies a threshold limit; in response to determining the number of the undetected attributes satisfies the threshold limit, deploying the trained machine-learning model; and detecting, by the trained machine-learning model, the attributes in a second subset of the unstructured data by providing the second subset as input to the trained machine-learning model, wherein the second subset of the unstructured data is different from the first subset of the unstructured data.

In some implementations, detecting the attributes in the second subset of the unstructured data by providing the second subset as input to the trained machine-learning model further includes: for each detected attribute: generating, by the trained machine-learning model, an identifier in the second subset of the unstructured data that represents (i) an identified location of the detected attribute and (ii) an indication of a detected attribute; generating, by the trained machine-learning model, a confidence level associated with the identifier that indicates how likely a corresponding detected attribute represents an actual attribute according to criteria; comparing the confidence level to a threshold level;

and in response to determining the confidence level satisfies the threshold level, labeling a portion of the unstructured data with the identifier at the identified location of the corresponding detected attribute.

In some implementations, automatically detecting the attributes in the unstructured data further includes: receiving data specifying criteria associated with attributes to be detected in the unstructured data; and receiving data specifying criteria associated with attributes not to be detected in the unstructured data.

In some implementations, the criteria specifies one or more of a name, a date of birth, a personal identifier, an age, a location, a medical diagnosis, a relevant date, personal characteristics, and an address.

In some implementations, determining the amount of undetected attributes and detected attributes in the unstructured data further includes: determining a number of identifiers associated with the detected attributes labeled in the unstructured data; and determining a number of undetected attributes in the unstructured data, wherein determining the number of undetected attributes comprises: determining a difference between (i) the number of identifiers associated with the detected attributes to (ii) a known number of detected attributes in the unstructured data, wherein the known number of detected attributes is supplied by an external party; and in response to determining the difference between (i) the number of identifiers associated with the detected attributes to (ii) the known number of detected attributes in the unstructured data, simulating the additional attributes according to the difference.

In some implementations, simulating the additional attributes according to the difference further includes: retrieving, from a storage device, a population distribution, the population distribution being an externally supplied reference distribution, or generated by the detected attributes in the unstructured data; and for each undetected attribute: sampling the population distribution for a sampled value; computing a sampling frequency according to the sampled value; and assigning the sampling frequency as the additional attribute.

In some implementations, analyzing the risk of disclosure in the unstructured data based on the detected attributes and the simulated additional attributes further comprises: for each detected attribute: assigning a first information value to a detected attribute according to samples retrieved from the population distribution; retrieving, from the storage device, a second population distribution, the second population distribution being generated by attributes that change with respect to time; for each simulated additional attribute: assigning a second information value to a simulated additional attribute according to samples retrieved from the second population distribution; aggregating, for each detected attribute and simulated additional attribute, the first information value and the second information value into an aggregated information value; and determining an anonymity value using at least one of the first information value, the second information value, the aggregated information value and a size of a population associated with the unstructured data; and determining the risk of disclosure in the unstructured data using the determined anonymity value.

In some implementations, modifying the detected attributes in the unstructured data according to the analyzed risk of disclosure further includes: determining a transformation approach for transforming or resynthesizing the detected attributes in the unstructured data based on the analyzed risk of disclosure; transforming or resynthesizing the detected attributes in the unstructured data according to the determined transformation approach, wherein the transformations comprise at least one of resynthesis, masking, generalizing, injecting noise, and imputing simulated values.

In some implementations, replacing the detected attributes with the modified detected attributes in the unstructured data further includes: generating structured data that represent the detected attributes from the unstructured data using identifiers associated with the detected attributes in the unstructured data; and applying the transformed or resynthesized attributes from the structured data to locations of the identifiers in the unstructured data, wherein applying the transformed or resynthesized attributes replaces the detected attributes from the unstructured data.

In some implementations, the method includes providing, to an external party, the unstructured data that comprises the modified detected attributes and the undetected attributes.

In an aspect, a method comprises building a disclosure model within an acceptable threshold based on uncertainty in the detection of attributes and values in unstructured information. The method also includes simulating the uncertainty in a detection model to capture disclosure risk (identification, attribution, and inferences) and ensure the use, sharing or release of information is below a predefined threshold. The method also includes simulating undetected attributes, known to be in the unstructured information but difficult to detect or to simplify the detection process, to understand their contribution to disclosure risk. The method also includes transforming or synthesizing replacements for the detected attributes in unstructured information based on a disclosure risk model incorporating detected attributes, uncertainty in the detection, and undetected attributes.

The subject matter described in this specification can be implemented in various embodiments and may result in one or more of the following advantages. By incorporating and managing the uncertainty of both detected and undetected attributes from the unstructured data into a model of disclosure risk, the system can perform data transformations or resynthesis that can be optimized and can provide assurance to ensure an amount of disclosure risk satisfies a threshold so that unstructured data can be used, shared, or released, in a secured manner. A disclosure impact assessment, as a result of tool performance, can enable the capturing of uncertainty and determine the degree of fine-tuning required to optimize the detection of disclosive information and the data transformations or resynthesis applied to the unstructured data.

The technology described in this specification has a direct impact on improving the degree of automation and reducing effort needed to manually review and redact content from unstructured data. As a result, a decision-making framework can be applied for compliance evaluation that captures both policy and technical aspects while being independent of the technical performance of a detection system to capture personal or confidential information.

The system offers additional benefits and advantages for managing both detected and undetected attributes into a model of disclosure risk. Specifically, the system can reduce reliance on subject-matter experts. The reduction in reliance on subject-matter experts can reduce a scope of attribute classification by incorporating simulation into the disclosure assessment. The system can perform a simulation that allows for approaches where some disclosive elements are entirely simulated, e.g., under conservative parameters, eliminating the need for subject-matter experts to annotate these fields in the unstructured data and the need to detect these elements to transform or resynthesize them in the anonymization.

An additional benefit of this technology is its overall reduction in computational processing. Specifically, the system can simulate some attributes rather than processing all detected and undetected attributes. By simulating some of the undetected attributes, a reduction in computation time and processing can be exhibited from scanning and detecting potentially disclosive attributes. Thus, the impact of the unstructured data grows as the volume of unstructured information increases, and the scope of what is detected overall decreases. Similarly, the usage of this technology reduces the overall memory requirements. Specifically, with fewer attributes to model and detect from the unstructured information, the memory footprint of the deployed model is also ultimately reduced. Moreover, with a reduction in the overall memory footprint of the deployed model, the manual effort to tag and annotate attributes in a training sample for the detection model is reduced since fewer attributes need to be detected from the unstructured information.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A is a graphical diagram that illustrates an example of anonymizing data according to measured disclosure risks.

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

Typical systems have withheld the use, sharing, or release of unstructured data due to the inability to detect personal or confidential attributes. In some examples, some systems cannot assess or heuristically judge the risk of using, sharing, or releasing data that may in fact be overly disclosive. The system described throughout this specification can anonymize unstructured information in an attempt to reduce its overall disclosure uncertainty. By incorporating this disclosure uncertainty into a process of data anonymization, and setting quantifiable benchmarks, the process to anonymize unstructured information can be driven by compliance considerations to ensure disclosure has been appropriately mitigated.

In some implementations, the system can enable the sharing of unstructured data, avoid over investment in manual or technical solutions, and/or solidify the business case for more sophisticated solutions where required. As described throughout the specification, the system can enable and increase data sharing of unstructured information while minimizing unknown leakage or uncertainty in residual risk according to a threshold value. By employing this solution, the system can enable and increase data sharing of unstructured information. Furthermore, this solution can be deployed to various departments and external parties that rely on data de-identification or anonymization for personally identifiable information (PII).

In some implementations, the system can generate de-identified or anonymized versions of the unstructured information for secondary use purposes. The secondary use purposes can include, for example, research, development, and quality assurance activities for both products and for core natural language processing (NLP) performance. An objective of data de-identification or anonymization can be to share high quality data for various purposes while balancing the regulatory requirements that the probability of re-identifying an individual in the data set is at a minimum. Thus, the de-identification or anonymization strategy outlined below can effectively balance the above requirements while generating de-identified or anonymized unstructured information.

Figure 1A:
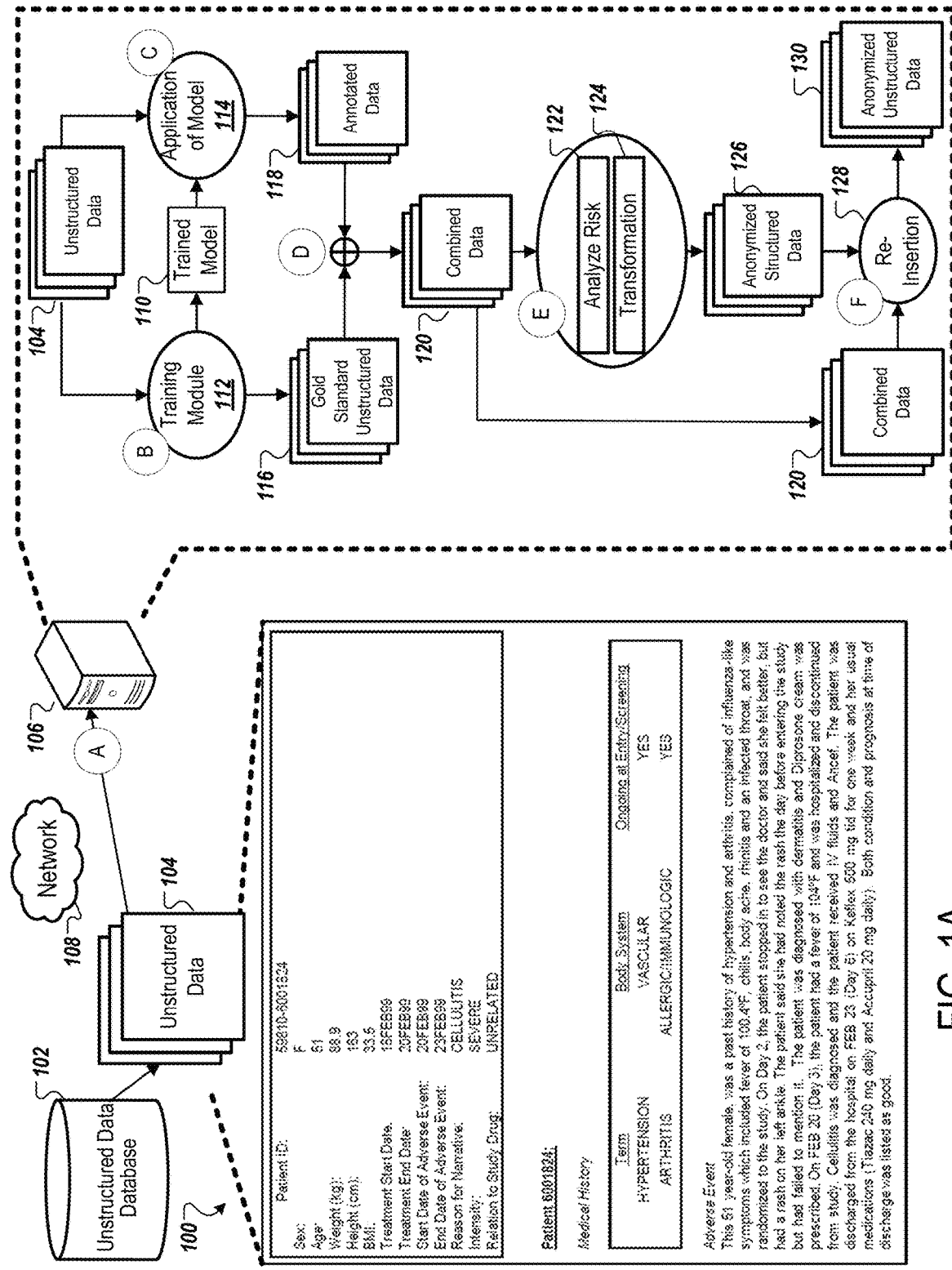
FIGS. 1A-1C are block diagrams that illustrate examples of a system for generating anonymized data according to measured disclosure risks using one or more machine-learning models.

FIG. 1A is a block diagram that illustrates an example of a system 100 for generating anonymized data according to measured disclosure risks using one or more machine-learning models. System 100 can include a server that utilizes a predictive model for incorporating uncertainty of both detected and undetected attributes related measuring disclosure risk. Moreover, the server can transform or resynthesize detected portions of unstructured data according to the predicted disclosure risk. In general, system 100 can receive unstructured data from a database, a computer, a user, or various computer systems, and process the data included in the unstructured data. FIG. 1A illustrates operations in stages (A) through (F), which may be performed in the sequence indicated, in another sequence, with fewer stages, or additional stages.

In some implementations, the system 100 can include an unstructured data database 102, a network 108, and a server 106. The server 106 can include one or more computers connected locally or connected over network 108. As will be further described below, the server 106 can include one or more processors, memory components, and other computer related components that can process data obtained from the unstructured data database 102 and produce anonymized unstructured data 130. In some examples, the server 106 can be configured to communicate with a client device over network 108 or other computer devices. The network can include for example, a local network, such as Bluetooth or Wi-Fi, or a larger network, such as the Internet. Alternatively, a user may directly interact with the server 106 by way of a touchscreen, or a monitor, keyboard, and mouse.

In some implementations, the unstructured data can include various types of information that is not formalized in an easily readable manner. The unstructured data can include, for example, text, an email, images, video, audio, medical records, a dataset, an email, a presentation, a textbook, a brochure, a website, and other information. In the example of system 100, the unstructured data database 102 can store various types of unstructured data or unstructured documents.

The unstructured data database 102 can store unstructured data related to a person, such as medical information related to a patient. The unstructured data can include one or more data files that include patient profile information. For example, the unstructured data 104 can be a document and can include patient profile information that includes various fields and corresponding values. The various fields can include, for example, a date of birth of a patient, province or state of residence, sex, age, weight, height, body mass index, a particular treatment start date, a particular treatment end date, start date of adverse event related to the treatment, an end date of an adverse event related to the treatment, a reason for a narrative of the adverse event, an intensity of the adverse event, and a relation to drug study.

The unstructured data 104 can include other patient information not organized in an easily understandable manner. For example, as illustrated in system 100, the unstructured data 104 can include other text, descriptions, and tables that describe medical history related to the patient. This can include a patient identifier of 6001824, a medical history table that shows the patient has a history of arthritis and hypertension, and other information. Moreover, the unstructured data can recite a description of medical issues—"[T]his 51 year-old female, has a past history of hypertension and arthritis, complained of influenza-like symptoms which included fever of 100.4° F., chills, body ache, rhinitis and an infected throat, and was randomized to the study. On Day 2, the patient stopped in to see the doctor and said she felt better, but had a rash on her left ankle. The patient said she had noted the rash the day before entering the study but had failed to mention it. The patient was diagnosed with dermatitis and Diprosone cream was prescribed. On February 20 (Day 3), the patient had a fever of 104° F. and was hospitalized and discontinued from study. Cellulitis was diagnosed and the patient received IV fluids and Ancef. The patient was discharged from the hospital on February 23 (Day 6) on Keflex 500 mg for one week and her usual medications (Tiazac 240 mg daily and Accupril 20 mg daily). Both condition and prognosis at time of discharge was listed as good." The unstructured data can be combined into multiple unstructured data files that may be difficult to read.

In some implementations, the server 106 can obtain structured information for anonymizing from other databases. The structured information can be stored in a database as extensible mark-up language (XML), JavaScript Object Notation (JSON), or another structured format. The structured information consists of fields and associated values that describe the subject. For example, the structured information may contain information related to a patient, such as a date of birth, province or state of residence, and gender. Further, the structured information can contain longitudinal data, i.e., temporal data, which either changes in time or describe an event at a particular time. Examples of longitudinal data can include information related to a hospital visit, e.g., admission data, length of stay, diagnosis, financial transactions, e.g., vendor, price, date, time, store location, or an address history, e.g., address location, start date at address, end date at address. The longitudinal data can also be found in the unstructured information.

In some implementations, the server 106 can obtain the unstructured data 104 from the unstructured data database 102 and process the unstructured information for disclosure control and anonymization. The server 106 can use one or more trained machine-learning models that are configured to detect personal or confidential information in the unstructured data. The trained machine-learning models can output data that indicates detected attributes or detected personal information in the unstructured data. The server 106 can analyze the accuracy of the trained machine-learning models' processing to determine whether any attributes were not detected in the unstructured data.

Based on the analyzing of attributes that were not detected in the unstructured data, the server can execute a simulation that simulates personal or confidential information that was missed or elected not to detect. For example, if the server 106 determines that 50 dates of birth were missed in the unstructured information detection, than the simulation can generate and produce 50 dates of birth. The server can then obtain a disclosure model that analyzes a risk of disclosure of the unstructured data. Specifically, the disclosure model is fed the detected attributes from the unstructured data and the simulated information to analyze the risk of disclosure. The server 106 can determine a transformation or resynthesis approach for detected attributes in view of the impact of undetected, and thus untransformable, attribute values in the unstructured data. The server 106 can apply the transformations or resynthesis according to the transformation or resynthesis approach to the detected attributes. In response, the server 106 can insert the transformed or synthetic attributes into the unstructured data. The result is anonymized unstructured data that are confidential, safe, and disclosure free versions of the unstructured information. The server 106 can then provide the anonymized unstructured data to a client device, another computer or server, or to an external party for further review and use.

During stage (A), the server 106 can obtain unstructured data 104 from the unstructured data database 102 over a network 108. In some examples, the server 106 can obtain unstructured data 104 from the Internet, knowledge bases, and other databases. In some examples, the server 106 can receive a request from a client device, e.g., mobile device or personal computer, that provides unstructured data and requests for anonymization of the provided unstructured data. In response to the server 106 receiving a request to anonymize the unstructured data, the server 106 can perform the processes to anonymize the unstructured data and provide the anonymized unstructured data to the corresponding client device, to a different client device, or to another device or system.

In some examples, the server 106 can receive data indicating a location of unstructured data to obtain. The data indicating the location of the unstructured data can include an address, for example, to a particular location in memory of a database, e.g., unstructured data database 102. The server 106 can retrieve the unstructured data 104 using the address to the location in memory of the database.

The example of unstructured data 104 shown in system 100 includes medical information related to 6001824. The unstructured data 104 can include longitudinal data describing various doctors' visits, which may describe one or more visits to the doctor for a particular patient. The unstructured data 104 can include stationary data, such as date of birth and patient name, which describes data that does not change over time, to name some examples. Moreover, the unstructured data 104 can include multiple unrelated fields, which renders the data un-structured or semi-structured and not have similar schema.

During stage (B), the server 106 can receive the unstructured data 104 and provide a subset of the unstructured data 104 to a training module 112 for training a machine-learning model. The machine-learning model can be trained to identify personally identifiable information (PII), confidential information, or other attributes from a set of unstructured and/or structured data. In some examples, the training module 112 can train the machine-learning model using one or more techniques with a subset of the unstructured data 104. In some examples, the training module 112 can train the machine-learning model with a subset of other unstructured data provided by a user, retrieved from the internet, or from another source.

Figure 1B:
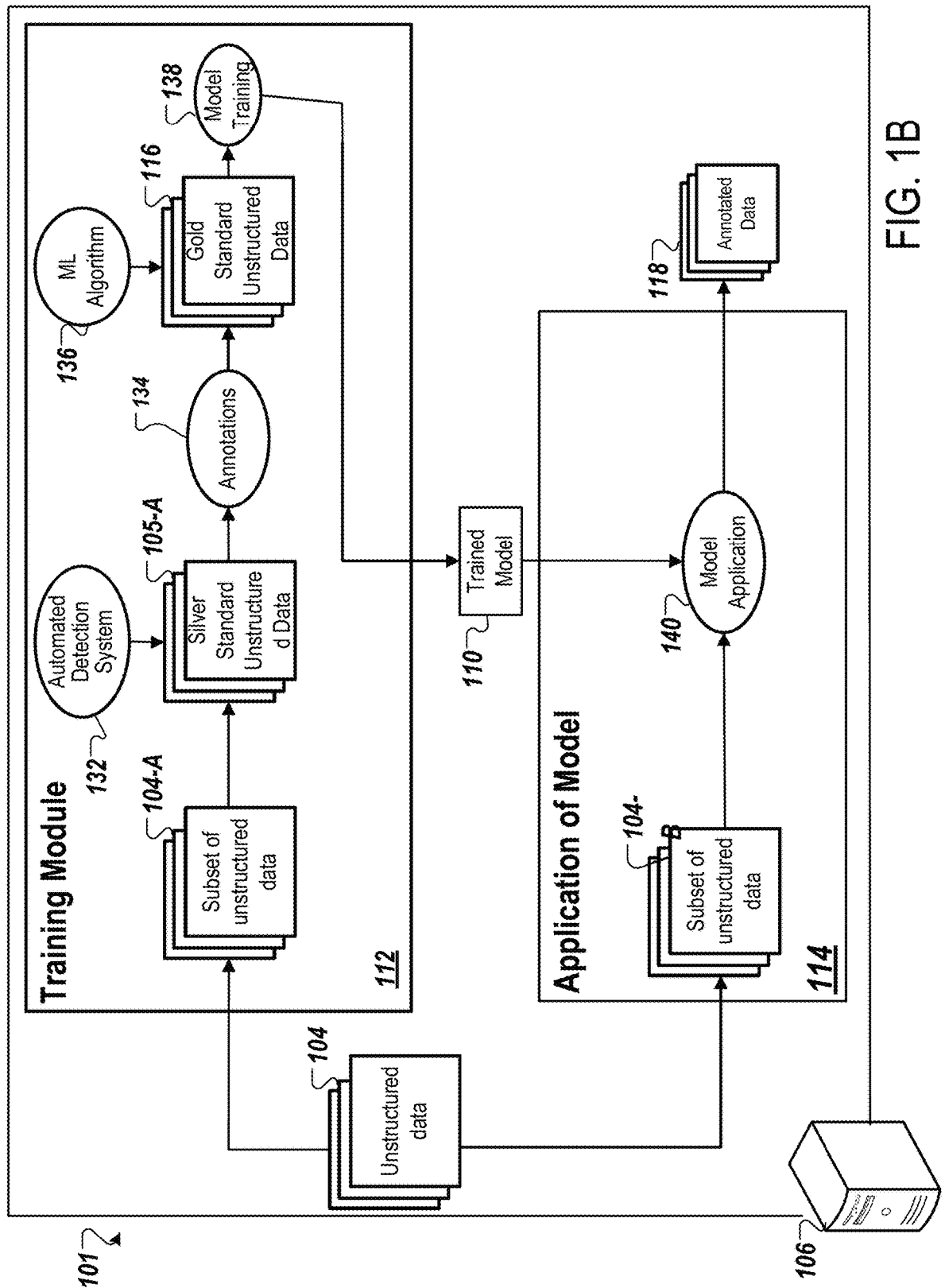

System 100 illustrates the unstructured data 104 provided to both the training module 112 and the application of model 114 in stage (B) and stage (C), respectively. FIG. 1B illustrates an expansion of the processes performed during stages (B) and (C) by the training module 112 and the application of model 114, respectively. Specifically, FIG. 1B is a block diagram that illustrates an example of a system 101 for generating anonymized data according to measured disclosure risks using one or more machine-learning models.

As illustrated in system 101, the training module 112 performs various functions related to training the machine-learning model. For example, the server 106 can segment the unstructured data 104 into a subset of unstructured data 104-A and a subset of unstructured data 104-B. In some examples, the subset of unstructured data 104-A may be smaller than the subset of unstructured data 104-B. For example, the number of unstructured data 104 is 10,000 and the server 106 can segment the 10,000 unstructured data files into a subset of 100 unstructured data 104-A and a subset of 9,900 unstructured data 104-B. In some examples, the number of unstructured data 104-A may be equivalent to the number of unstructured data 104-B. In some examples, the server 106 can utilize other unstructured data, separate from unstructured data 104, to train the machine-learning model.

In some examples, the machine-learning model can include a DistilBert model with a token classification layer on top of the hidden-states output for Named Entity Recognition (NER). This architecture provides state-of-the-art performance for the specific task of NER. Another expression of the classification layer may include, for example, a Long Short Term Memory (LSTM) Recurrent Neural Network (RNN) in place of the token classification layer. The training module 112 can train the machine-learning model using, for example, gradient descent, and ultimately improve the classification and/or detection of attributes in the unstructured documents. During application of the trained machine-learning model, the DistilBert model can accept inputs of data indicative of the unstructured data. Additionally, the classification layer can be trained to accept data that configures the model to detect certain criteria.

In some implementations, the training module 112 can train the machine-learning model to receive criteria for detection. Specifically, the criteria can include, for example, certain types of attributes for the model to detect and/or certain types of attributes for the model to not detect. The types of attributes can include, for example, dates of birth, names, medical diagnoses, medical diagnoses codes, age, and addresses, to name a few examples. Initially, the training module 112 can train the machine-learning model to detect all criteria available to server 106. In this manner, the machine-learning model can be configured to detect any type of criteria presented in the unstructured data. As the machine-learning model is trained, the training module 112 can introduce configurations to the model that instruct the model to detect a specified amount of attributes. For example, the training module 112 can configure the model to detect only date of births and avoid detecting names, medical diagnoses codes, ages, and other types of criteria found in the unstructured data. Similarly, the training module 112 can configure the model to detect multiple but not all types of criteria, such as date of births and medical diagnosis codes, but not ages or other types of criteria. In some examples, the machine-learning model can be trained in an iterative and a recurring processing.

The training module 112 can configure the model to accept various forms of input for selecting the type of criteria to detect and the type of criteria to avoid detecting. Specifically, the training module 112 can train the model to receive data that indicates the type of criteria to detect. The data can be, for example, binary values, flags, code words, text, or other indicators that signify to the model what type of criteria to detect or avoid detecting. As illustrated in system 101, the automated detection system 132 can include a set of operations utilized by the training module 112 to train the machine-learning model. In some examples, the automated detection system 132 can include a set of rules and a set of expressions configured by a designer of system 100 to train the machine-learning model in a particular manner. These rules and expressions can designate types of training to be performed, particular data elements to search for in the unstructured data, weights applied to particular criteria, and other examples. In some examples, the automated detection system 132 can also include a knowledge base and set of rules that can evolve over time when training the machine-learning model to detect attributes in the unstructured data. In some examples, the automated detection system 132 can include a pre-trained machine-learning model that is configured to detect various attributes in the subset of unstructured data 104-A. In some examples, the automated detection system 132 can include a combination of the pre-trained machine-learning model that is configured to detect various attributes in the subset of unstructured data 104-A and a set of rules and expressions. In the combination, the sets of rules and expressions can configure the pre-trained machine-learning model for specific attributes to detect in the unstructured data 104-A. Other examples are also possible.

During the training process illustrated in training module 112, the training module 112 can provide the subset of unstructured data 106-A as input to the untrained machine-learning model. The automated detection system 132 can output silver standard unstructured data 105-A. The silver standard unstructured data 105-A can include the subset of unstructured data 104-A with annotations 134 produced by the untrained machine-learning model. The annotations 134 can include data that identifies (i) locations of detected attributes on the unstructured data 104-A and includes (ii) confidence levels associated with the identifiers that indicates how likely the corresponding detected attribute represents an actual attribute according to the designated criteria. For example, the automated detection system 132, e.g., using the pre-trained machine learning model, can produce a label which is tagged to a location of the detected attribute on a corresponding portion of the unstructured data 104-A. The label can reflect a confidence level, such as 90%, that the detected attribute represents an actual attribute according to designated criteria, e.g., date of birth. The automated detection system 132 can produce a label for each detected attribute and tag the corresponding attribute with the label. As mentioned above, the automated detection system 132 can be expressed as a pre-trained machine-learning model, a set of rules and expressions, a combination thereof, or other systems. The silver standard unstructured data 105-4 can include the labeled tags.

In some examples, instead of tagging the labels on the detected attributes, the machine-learning model can produce a data file that lists in tabular form, data indicating a detected attribute, a corresponding location of the detected attribute, and a corresponding confidence level that the detected attribute represents an actual attribute according to designated criteria. In some examples, a detected attribute in the tabular list can include an image of the detected attribute, e.g., "WEIGHT(kg): 88.9", pixel coordinates of the detected attribute originating from the bottom left corner of an unstructured document, e.g., "1.234, 20.12", and a confidence of 90%. The tabular list can depict the detected attribute information for each detected attribute identified in the unstructured data 104. In some examples, the silver standard unstructured data 105-A can be represented and depicted in other manners. In some examples, a document stored in editable plain text may be augmented with metadata tags, e.g. a phrase "the patient is male" could be annotated by the automated detection system 132 to produce the phrase "the patient is <GENDER, id=0001>male</GENDER>" unifying the unstructured data and the detected attributes.

In some implementations, the training module 112 can initiate the process of reviewing the silver standard unstructured data 105-A and the corresponding annotations 134 to enhance the detection capability of the trained machine-learning model. Initially, the machine-learning model may exhibit inaccuracies in detecting attributes in the subset of unstructured data 104-A. In some examples, the trained machine-learning model may not detect 50 dates of birth, 10 ages, and 20 medical codes in the subset of unstructured data 104-A. In some examples, the trained machine-learning model may not detect 3% of all gender identifiers in the subset of unstructured data 104-A. Other examples are possible.

In some implementations, in order to enhance and improve the detection capabilities of the machine-learning model, a human operator can provide input and/or configuration to the processes performed by the training module 112. In further detail, the human can provide input and/or configuration to the process by manually reviewing the silver standard unstructured data 105-A and annotations 134. The human operator can identify whether each detected attribute was accurately detected. Additionally, the human operator can manually review the silver standard unstructured data 105-A and annotations 134 to determine whether the machine-learning model missed one or more attributes. However, in order to put forth a critical review, the human operator can ensure the trained machine-learning model was not configured to avoid detection of some criteria. In the event the trained machine-learning model was instructed to detect various criteria but did not detect attributes related to the various criteria, then the human operator can mark the missed attribute as an attribute that should have been detected. Alternatively, the human operator can disregard missed attributes in the silver standard unstructured data 105-A that it was not configured to detect.

In some implementations, the human operator can label the attributes not detected by the machine-learning model in the unstructured data. These attributes can be labeled by, for example, a flag, a notification, or some other type of descriptor that indicates the machine-learning model missed the attribute. In some examples, the labels can include metadata that tags and adds information to the detected attribute. Then, when the training module 112 retrains the machine-learning model, the training module 112 can emphasize attributes that were missed during detection. The training module 112 can, for example, weigh the missed attributes higher than other attributes that were previously detected to ensure the machine-learning model correctly detects those attributes for subsequent detections. Other examples are also possible.

In some implementations, the training module 112 can be used in place of a human operator for identifying missed attributes from the unstructured data 105-A. Specifically, the training module 112 can obtain of unstructured data that include previously labeled attributes. The training module 112 can input the same unstructured data into the machine-learning model and obtain detected attributes output from the machine-learning model. Then, the training module 112 can compare (i) the detected attributes output from the machine-learning model to (ii) the previously labeled attributes included in the same unstructured data. The (i) detected attributes and (ii) the previously labeled attributes should be equivalent. However, in the event the (i) detected attributes and (ii) the previously labeled attributes are not equivalent, the training module 112 can determine the machine-learning model miss-detected some attributes. Based on those miss-detected attributes, the training model 130 can label those miss-detected attributes with a flag, notification, or some other type of descriptor, and retrain the machine-learning model using the descriptors associated with the miss-detected attributes. Other examples for identifying the attributes and retraining the model are also possible.

In some implementations, the training module 112 can utilize one or more pre-trained models to generated gold standard unstructured data 116 from the silver standard unstructured data 105-A. The pre-trained models can be configured to determine whether identified attributes in the silver standard unstructured data 105-A were accurately identified. The pre-trained models can compare the identified attributes in the silver standard unstructured data 105-A to commonly found attributes in other unstructured data that has been accurately verified. Based on the comparison, the pre-trained models can label any missed attributes.

In some implementations, the training module 112 can produce gold standard unstructured data 116. The gold standard unstructured data 116 can include, for example, the silver standard unstructured data 105-A with the annotations 134 produced by the machine-learning model and the additionally labeled attributes that were not detected by the machine-learning model. The training module 112 utilizes the gold standard unstructured data 116 as the so called "gold standard" because each attribute in these unstructured data have been identified, making these unstructured data sufficient as a training dataset for the machine-learning model.

The training module 112 can execute one or more machine-learning algorithms 136 to train the machine-learning model during the model training 138. The training module 112 can choose from the one or more machine-learning algorithms 136 for training the machine-learning model. For example, the training module 112 can choose from conditional random fields (CRF) and bi-directional long short-term memory (Bi-LSTM) algorithms. Other examples are also possible. The training module 112 can apply a selected algorithm to the machine-learning model and train the model accordingly using the gold standard unstructured data 116.

In some implementations, the training module 112 can continuously train the machine-learning model at the model training 138 until the model is sufficiently trained. The machine-learning model is sufficiently trained once the training module 112 determines the machine-learning model can detect attributes in unstructured data that satisfy a threshold value. A designer of system 100 may set the threshold value to be, for example, 10 detected attributes. In this example, once the training module 112 determines the machine-learning model miss detects no more than 10 detected attributes in the gold standard unstructured data 116, then the training module 112 can produce a trained model 110 to apply to the application of the trained model.

The training module 112 can continuously train the machine-learning model using various types of unstructured data. In some examples, the training module 112 can continuously train the machine-learning model using the same set of unstructured data until the model accurately detects attributes in the unstructured data that satisfies a threshold. In some examples, the training module 112 can continuously train the machine-learning model using different sets of unstructured data to expand the model's exposure to different types of attributes to detect. In some examples, the training module 112 can continuously train the machine-learning model using a combination of the same and different sets of unstructured data.

As illustrated in system 100 in FIG. 1A, once the machine-learning model is sufficiently trained the training module 112 can provide the trained model 110 to the application of model 114. The functions and processes performed during stage (C) of system 100 is expanded upon in the application of model 114 shown in FIG. 1B.

During the model application 140, the trained model 110 can receive the remaining unstructured data 104-B from the unstructured data 104 and process the unstructured data 104-B. As mentioned above, the trained model 110 can analyze the unstructured data 104 for attributes according to set criteria. In some examples, an implementer of system 100 can configure the trained model 110 to detect dates of birth, names, medical codes, and medial prognosis. In some examples, the implementer of system 100 can configure the trained model 110 to detect only dates of birth and to avoid detecting all other criteria. In some examples, the implementer of system 100 can configure the trained model 110 to detect one or more attributes and avoid detecting one or more other types of attributes according to the set criteria.

In some implementations, the trained model 110 can output the annotated unstructured data 118. The annotated unstructured data 118 can include, for example, the subset of unstructured data 104-B with annotations produced by the trained model 110. As previously mentioned, the annotations can include data that identifies (i) locations of detected attributes on the unstructured data 104-B and includes (ii) confidence levels associated with the identifiers that indicates how likely the corresponding detected attribute represents an actual attribute according to the designated criteria. The annotated unstructured data 118 can be provided to the next stage in the processing by the server 106.

As illustrated in system 100, the application of model 114 can output the annotated unstructured data 118. During stage (D), the server 106 can combine the gold standard unstructured data 116 with the annotated unstructured data 118. As mentioned above, the training module 112 produced the gold standard unstructured data 116 during the training of the machine-learning model. The gold standard unstructured data 116 can represent the subset of unstructured data 104-A that were processed by the training module 112 and the annotated unstructured data 118 can represent the subset of unstructured data 104-B that were processed by the application of model 114. Thus, the combination of the gold standard unstructured data 116 with the annotated unstructured data 118, e.g., combined unstructured data 120, represent the totality of the processing of the unstructured data 104. For example, if the number of unstructured data 104 is 10,000, then the number of combined unstructured data files 120 would be the sum of the number of gold standard unstructured data files 116 or 7,000 and the number of annotated unstructured data files 118 or 3,000, which equates to 10,000.

Figure 1C:
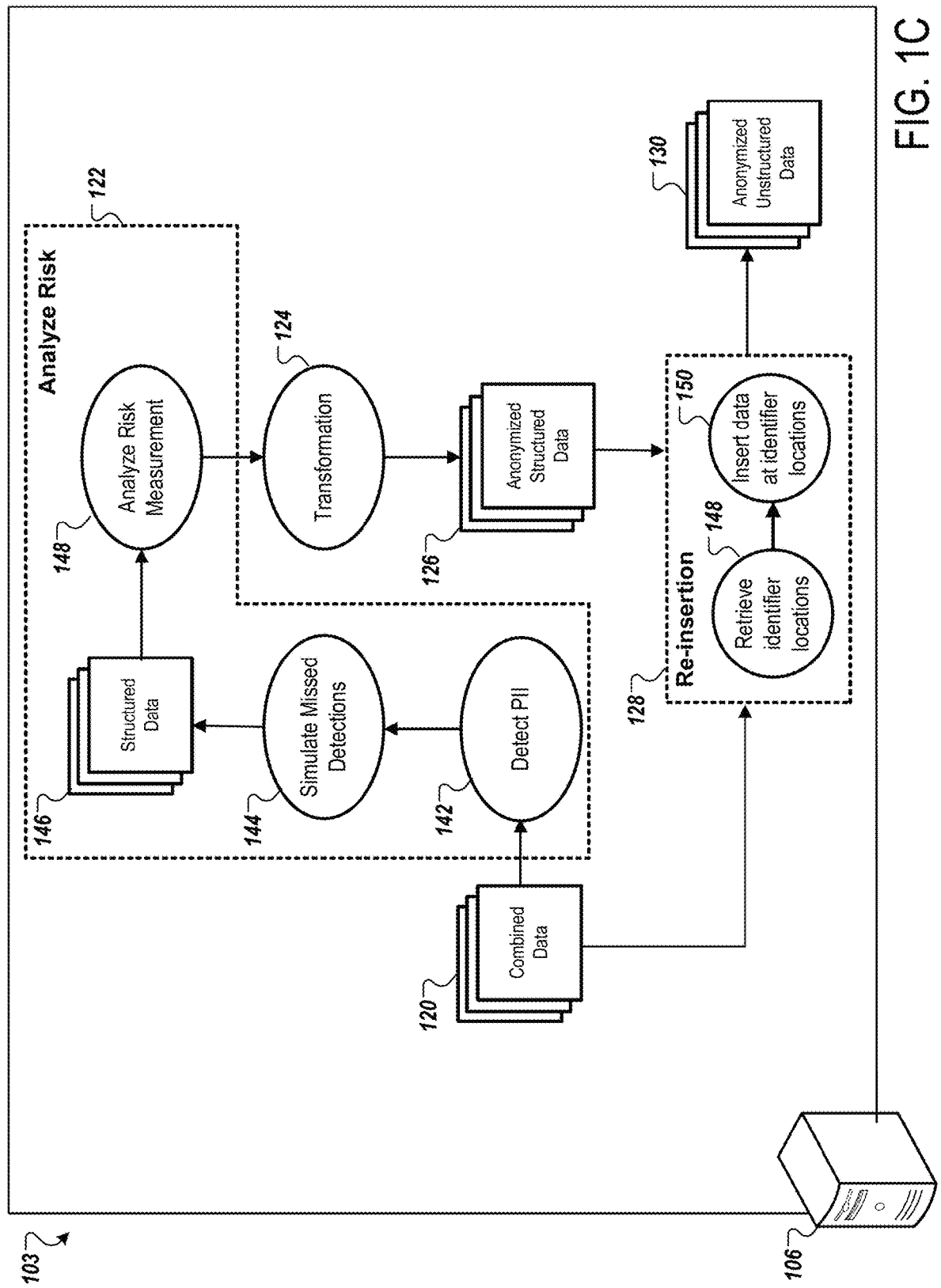

System 100 illustrates the combined unstructured data 120 provided to the processes of analyzing risk 122 and transformation or resynthesis 124 during stage (E). For example, the combined unstructured data 120 represent the unstructured data. Moreover, the anonymized structured data 126 output from the transformation or resynthesis 124 is provided to the process that performs re-insertion during stage (F). FIG. 1C illustrates an expansion of the processes performed during stages (E) and (F) by the server 106. Specifically, FIG. 1C is another block diagram that illustrates an example of a system 103 for generating anonymized data according to measured disclosure risks using one or more machine-learning models.

Specifically, as illustrated in system 103, the server 106 can provide the combined unstructured data 120 to the analyze risk process 122. The server 106 can perform processes for risk based on particular identifiers, e.g., the detected attributes. In disclosure control and risk measurement each field in a schema can be classified into direct-identifiers (DI), quasi-identifiers (indirect identifiers) (QI), and non-identifiers (NI). For ease of understanding, the variable Q is assumed to incorporate any relevant confidential attributes needed to estimate disclosure risk. Thus, the server 106 can generically apply to any value regardless of classification, however, QIs (or QI fields) will be referred to as this is normally utilized in risk measurement.

The direct-identifiers can be used to uniquely identify an individual, either by himself or herself or in combination with other readily available information. For example, there may be more than 200 people named "John Smith" in Ontario (based on a search in the White Pages), therefore the name by itself would not be directly identifying, but in combination with the address, it would be directly identifying information. A telephone number is not directly identifying by itself, but in combination with the readily available White Pages, it becomes so. Other examples of directly identifying variables can include, for example, email address, health insurance card number, credit card number, and social insurance number. These numbers are identifying because there exist public and/or private databases that an adversary can plausibly get access to where these numbers can lead directly, and uniquely, to an identity.

The quasi-identifiers can represent the background knowledge variables about individuals in the disclosed data set that an adversary can use, individually or in combination, to probabilistically re-identify a record. If an adversary does not have background knowledge of a variable, then it cannot be a quasi-identifier. The manner in which an adversary can obtain such background knowledge will determine which attacks on a data set are plausible. For example, the background knowledge may be available because the adversary knows a particular target individual in the disclosed data set, an individual in the data set has a visible characteristic that is also described in the data set, or the background knowledge exists in a public or semi-public registry.

Examples of quasi-identifiers can include sex, date of birth or age, locations (such as postal codes, census geography, information about proximity to known or unique landmarks), language spoken at home, ethnic origin, aboriginal identity, total years of schooling, marital status, criminal history, total income, visible minority status, activity difficulties/reductions, profession, event dates (such as admission, discharge, procedure, death, specimen collection, visit/encounter), codes (such as diagnosis codes, procedure codes, and adverse event codes), country of birth, birth weight, and birth plurality.

The non-identifiers can reflect variable that are not useful for determining an individual's identity. Examples can include laboratory test results, drug dosage information, payment information for medical provider, and other non-clinically relevant or quasi-identifier information.

In some implementations, the server 106 can detect personal identifiable information (PII) or attributes from the combined unstructured data 120 in processes 142. In some examples, a human operator can review the combined unstructured data 120 and its corresponding annotations to identify the detected attributes and the attributes that were not detected by the trained machine-learning model. In some examples, a machine automated process, e.g., a machine-learning model, a classifier, or other processes, can review the combined unstructured data 120 and its corresponding annotations to identify the detected attributes and the attributes that were not detected by the machine-learning model. The PII or the attributes in the combined unstructured data can include, for example, date of birth of a patient, provide or state of residence, sex, age, weight, height, body mass index, a particular treatment start date, a particular treatment end date, start date of adverse event, end date of adverse event, reason for a narrative, an intensity of the adverse event, and a relation to drug study, to name some examples.

During 144, the server 106 can simulate the missed detections for further determining the risk of the disclosure of the unstructured data. By simulating the missed detections, the server 106 can reduce the amount of data that needs to be detected. For example, rather than inspect the entirety of the combined unstructured data 120 in order to identify all quasi-identifying fields, the server 106 can simulate the missed detections. Over time, the server 106 can generate and track a list of commonly occurring but difficult-to-detect quasi-identifying fields. For each such field, the server 106 can create a distribution of values, e.g., information values from other sources. Then, when risk measurement is performed, e.g., during 148, the server 106 can select the random simulated values for these fields from these distributions. Quasi-identifying values can then be selected for each field with multiplicity equal to the randomly selected according to the estimated undetected count. Other examples are also possible. As such, the overall risk measurement uses both the detected attributes and the simulated attributes in the anonymization process.

The implementation of simulated contributions can simplify classification, reduce manual effort, and increase the server 106's execution of the anonymization process of the combined unstructured data 120. As a result, this can save computing resources by reducing processor and memory usage during the anonymization process. Furthermore, additional resources can be focused on automation for de-identification, where the identifiers are transformed or resynthesized. Rather than a prescriptive approach, de-identification can be customized to maintain maximum data utility in the most desired fields.

For any quasi-identifying field or miss-detected attribute, which is to be simulated, a population distribution must be created. These population distributions can be obtained from a variety of sources, including, but not limited to a single large dataset, an aggregation of small dataset, census or other data sources, research papers, unstructured data, or data retrieved from the internet etc. A population distribution may also be derived from other distributions, including but not limited to joint distributions. The distribution may be comprised of the distribution of actual values, the distribution of the raw information values of the actual values, or the distribution of knowable information values of the actual values.

A second distribution can be created that reflects the number of longitudinal quasi-identifying values held by individuals in the population. In some examples, longitudinal quasi-identifying values are those which a person has an unknown number of, such as medical diagnoses, as opposed to those which always have a cardinality of one, such as date of birth. As with the values, the counts may be sourced from a single dataset, an aggregation of multiple datasets, or other external sources. The raw population distributions may be processed in various manners, such as by smoothing algorithms, for example. A single set of distributions may be created for multiple risk measurement projects or created in a bespoke manner for each individual risk measurement project.

The server 106 can store the sources of the two types of distributions as a whole, or the sources of actual values, frequency of values, the information values of the actual values, or the number of longitudinal quasi-identifying values held by individuals in the anonymized unstructured data 130.

These distributions may also be compared or validated against historical/prior information by the server 106. In response, the server 106 can generate or update a posterior risk estimate using any newly obtained data/evidence. The server 106 can generate or update the posterior risk estimate in applications including, but not limited to, Bayesian risk estimation, and anonymization of streaming data.

When the server 106 receives the combined unstructured data 120, for each data subject in the combined unstructured data 120, the server 106 can randomly select a random value for each demographic quasi-identifying value from the associated population distribution. A random count of longitudinal values from the distribution of counts for that data subject, e.g., either a single count for that data subject which is shared across all longitudinal quasi-identifying values, or a separate count for each longitudinal quasi-identifying field. Quasi-identifying values are then selected for each field with multiplicity equal to the associated randomly selected count. Once the identifying variables are sufficiently identified in the dataset, the server 106 can retrieve the appropriate population distributions for the remaining randomly generated quasi-identifying fields. Other (true) quasi-identifying fields use their own population distributions as applicable.

Cross sectional (or L1) QIs are those that are found at most once for each individual or subject in the combined unstructured data 120. For example, subject height and weight at intake tend to be included in risk measurement and appear as a measured value in many clinical trials. Accordingly, certain assumptions can be made about the height and weight distributions that enables modeling on a per-participant basis.

Given these assumptions, the server 106 can generate histograms using the desired L1 quantities for each participant by aggregating L1 data across a number of completed studies, such that the server 106 can derive probability densities using resultant histograms, the probability densities representing the probability of having a certain value of the desired quantity. Sample frequencies (or priors) can also be computed from this aggregated data, which can be used directly in risk measurement. These estimates may also be used by the server 106 in the context of Bayesian risk estimation, wherein the given data/evidence is compared to historical/prior information to generate a posterior risk estimate. Such an implementation would have applications within the anonymization of streaming data, for example.

In some examples, one possible method for simulating L1 contributions to risk measurement may be implemented as follows: For each data subject in the combined unstructured data 120 and for each L1 quantity to be simulated: sample from the probability density functions representing the desired L1 quantity; and compute the sample frequency corresponding to the sampled value and assign this value for the simulated value.

In practice, there are a number of QIs which, if found in the combined unstructured data 120, may be treated as cross sectional variables. For example, baseline lesion size may be considered in risk measurement for a clinical trial focused on skin cancer, or pregnancy status for female participants. Given a sufficient amount of data, it may be possible to model such quantities using the same general algorithm described above. Bayesian priors may also be used, such that samples or other relationships in the data may be used as evidence to update or generate a posterior estimation of disclosure risk. Such modelling would further reduce analyst workload in terms of data modelling and classification, particularly when such quantities are embedded in complex tabular data structures such as key-value pairs.

In some implementations, the server 106 can simulate the missing detected using various processes. In some examples, if the server 106 determines that the trained model 110 missed twenty date of births, then the server 106 can randomly generate twenty dates of birth that are close in date to other dates of birth found in the combined unstructured data 120 that the trained model 110 did detect. The server 106 can use a random seed, a counting method, an averaging method, or any other method to randomly select values for the attributes that were not detected. If the server 106 missed twenty dates of birth, ten ages, and fifty gender identifiers during stage (C), then the server 106 can simulate twenty dates of birth, ten ages, and fifty gender identifiers for the risk assessment.

In some implementations, the server 106 can simulate attributes that were configured to be avoided during detection. If the trained model 110 did in fact detect attributes in the combined unstructured data 120 that it was configured to avoid detecting, then the server 106 can simulate an amount of these attributes. In some examples, the trained model 110 can process the combined unstructured data 120, identify one thousand birth dates, and avoid detecting and labeling the one thousand birth dates as detectable attributes. As such, the server 106 can simulate the one thousand birth dates for the risk assessment.

In some examples, during the model training and validation process, the training module 112 can determine metrics for the trained model 110 on sample data. From the sample data, the training module 112 can determine that the trained model 110 captured 88% of dates of birth. In response and during application of the model in 142 and 144, the server 106 can estimate that roughly 12% of dates of birth will be missed by the trained model 110 and simulate 12% of dates of birth, e.g., if 50 dates of birth are detected, then the server 106 can estimate that roughly 6 dates of birth were not detected and simulate 6 dates of birth. In some examples, the server 106 can simulate undetected data based on external knowledge indicating attributes in the unstructured data describes a particular medical condition. In this manner, the server 106 can simulate the identifiability contribution, e.g., the particular medical condition, without detecting that specific attribute or attributes in the data.

In some implementations, the server 106 can generate structured data 146 from the output of the simulated missed detections 144. The structured data 146 can include, for example, the combined unstructured data 120, the labels representing each of the detected attributes, and the simulated missed detections. Moreover, the structured data 146 can be organized in a tabular format or a schema, such as an XML, JSON, or other tabular format. The tabular format can list each detected attribute, e.g., their field and corresponding values, and the labels for the detected attribute. Generally, the structured data 146 can store the fields and corresponding values detected from the combined unstructured data 120.

At 148, the server 106 can determine the risk measurement of the structured data 146. In some implementations, the server 106 can analyze the risk of the unstructured information according to attacks that can occur. Specifically, an adversary or attacker can be defined as an individual or group of individuals with the motives and/or opportunity to successfully re-identify an individual in the data set with the intention of using the data in ways potentially harmful to individuals in the data set or data provider. Without the server 106 performing the anonymization or de-identification process on the unstructured data, the unstructured data remain at risk to the attacker. Moreover, some risks can be analyzed in view of a type of attack against the unstructured information. For example, the types of attacks can include a deliberate attempt, an inadvertent attempt, and a data breach attempt.

The determination of simulation and risk scores, for example, may be similar to those described in U.S. patent application Ser. No. 16/991,199, which is hereby incorporated by reference in its entirety.

In some implementations, the server 106 can determine a quasi-identifier risk measurement. In some examples, the quasi-identifiers can represent those that were detected during the review of the silver standard unstructured data files 105-A. Any PII information detected in the silver standard unstructured data files 105-A, which represents the quasi-identifiers, can be extracted into tabular form or structured data, e.g., structured data 146, for risk measurement.

In some implementations, the server 106 can produce additional quasi-identifying elements in simulation to augment the attributes detected and extracted from the unstructured data files 120. Based on the detection performance of the machine-learning model, the server 106 can simulate QI instances to reflect those elements not detected. The rate of simulated QIs can be adjusted by accounting for the effect of Hiding In Plain Sight (HIPS)—that is, the extent to which an adversary might discern between transformed and original unstructured data elements.

Based on the one or more determined scores associated with the re-identification risk, the server 106 can perform one or more transformations, including resynthesis, in 124 on the identified attributes in the structured data files 146. For example, the server 106 mask each of the following fields as detected, by replacing the identified attributes with securely randomly selected realistic surrogates. The fields to be replaced can include account numbers, street addresses, email, geopolitical entities (e.g., coarse location information), hospital names, ID numbers, IP addresses, subject IDs, locations, medical record numbers, names, medical organizations, phone numbers, serial numbers, websites, and ZIP Codes. In some examples, the server 106 can apply transformations or resynthesizations which modify detected identifiers to retain some relationship to the source data, including by shifting dates including dates of birth or by generalizing ages to a coarser resolution, for example of one year or two years.

In some implementations, de-identification transformations can represent data transformation techniques that reduce or eliminate the identifiability associated with a particular field of value. Broadly, de-identification techniques can be divided into various categories: masking techniques, generalization techniques, and suppression techniques. Masking can represent concealing the original identifiers with artificial data. Generalizing can be used to reduce the precision of a field. For example, a date of birth or a date of a visit to a doctor's office can be generalized to a month and year, to a year, or to a five-year interval. Generalization maintains the truthfulness of the data but can reduce its precision. Suppression can include the processes of replacing a value in a data set with a null value (or any other value used to indicate a missing value).

In some examples, masking techniques can completely obfuscate the relationship between an original and replacement value, without any consideration to preserving utility of the original value. Masking techniques can include, for example, hashing, encryption, field suppression, pseudonymization, or randomization. Masking tends to distort the data significantly so that no analytics can be performed on it. Masking can be applied to direct identifiers found in the data, but may also be applied to quasi-identifiers if their source values are not required for analytic purposes. For example, a name can be replaced with a randomly selected name from a large database of names, or it can be replaced with a pseudonym that still allows you to track the individual. Pseudonyms can be transient or persistent over time.

In some implementations, the server 106 can perform masking operations for transformations. The server 106 can use appropriate masking techniques that utilize a strong algorithm that complies with practices and standards, such as those recommended by NIST.

In some implementations, de-identification can involve minimally distorting the data so that meaningful analytics can still be performed, while still being able to make credible claims about protecting privacy. De-identification techniques can be applied to indirect identifiers or quasi-identifiers, such as clinical dates and ZIP codes, using generalization, cell or record suppression, or sub-sampling. Re-identification risk from the combination of quasi-identifiers in a data set can be measured as a probability, with a range of zero to one, as outlined above.

In some implementations, the server 106 can generate the anonymized structured data 126 using the data transformations. Specifically, the anonymized structured data 126 can include the structured data 146 with the transformations or resynthesis applied to the data values. For example, the anonymized structured data 126 can include the structured data 146 with data values that have been synthesized, masked, injected with noise, obfuscated, or inserted with some other marker to anonymize the data values. This process is similarly shown in system 100 of FIG. 1A.

As shown in system 100 of FIG. 1A, during stage (F), the server 106 can re-insert the newly transformed or resynthesized data from the anonymized structured data 126 into the combined unstructured data 120. The server 106 can produce anonymized unstructured data 130 by inserting the newly transformed or resynthesized data into the combined unstructured data. The re-insertion process 128 is further described in FIG. 1C.

In some implementations, the re-insertion process 128 can include multiple processes for inserting the newly transformed or resynthesized data into the combined unstructured data 120. The multiple processes can include an initial process 148 for retrieving identifier locations and a secondary process 150 for inserting data at identifier locations. In the initial process 148, the server 106 can search through the combined unstructured data 120 for the identifiers. The identifiers represent notifications that indicate a location of a detected attribute in the combined unstructured data 120 and a confidence level that represents a likelihood that the detected attribute represents an actual attribute. In some examples, the server 106 can search through the identifiers and retrieve those identifiers whose confidence level satisfies a threshold value. For example, the server 106 can retrieve identifiers whose confidence level, e.g., statistical value, meets or exceeds a threshold value of 90%. Any identifiers whose confidence level does not satisfy the threshold value, which may be designated by a designer of system 100, is discarded.

For each retrieved identifier, the server 106 can retrieve the (i) the location of the detected attribute, (ii) the field of the detected attribute, (iii) the value of the detected attribute, and (iv) the confidence level. The server 106 can utilize information (i)-(iv) to insert data from the anonymized structured data 126 to the identifier locations in the secondary process 150. For example, the server 106 can utilize (i) the location of the detected attribute and (ii) the field of the detected attribute to retrieve the corresponding field and value in the anonymized structured data 126. In this example, (i) the location of the detected attribute may be at pixel coordinates (0.1234, 1.2456) on page 5 in the combined unstructured data 120 and (ii) the field of the detected attribute may be "Date of Birth of Patient". In response, the server 106 can retrieve the newly transformed or resynthesized value that represents the "Date of Birth of Patient" in the anonymized structured data 126 on page 5 of the unstructured data 126. Then, the server 106 can replace (iii) the value of the detected attribute at pixel coordinates (0.1234, 1.2456) on page 6 of the combined unstructured data 120 with the newly transformed or resynthesized value.

In some implementations, the server 106 can replace values in the combined unstructured data 120 using a variety of processes. In some examples, if the combined unstructured data 120 are electronic documents, the server 106 can create an optical character recognition (OCR) version of the combined documents 120, delete the previous value, and type in the newly transformed or resynthesized value. In some examples, if the combined documents 120 are electronic documents, the server 106 can create an OCR version of the combined documents 120, white out the previous value, and type in the newly transformed or resynthesized value. The server 106 can also cover the previous value with symbols and type in the newly transformed or resynthesized value. In some examples, if the combined unstructured data 120 include physical documents, then the server 106 can scan a copy of the page of the document that is to receive the newly transformed or resynthesized value, OCR the scanned copy, delete the previous value at the (i) location of the detected attribute, type in the newly transformed or resynthesized value, and print out the new page with the newly transformed or resynthesized value at the (i) location of the detected attribute. Other examples for re-insertion are also possible.

In response to re-inserting the newly transformed or resynthesized data, the server 106 can produce the anonymized unstructured data 130. In some implementations, the server 106 can provide the anonymized unstructured data 130 to various devices. Specifically, the server 106 can provide the anonymized unstructured data 130 to, for example, a client device, a third party, a network attached storage, a database, memory, or other devices. In some examples, the server 106 can provide data indicative of the anonymized unstructured data 130 to a dashboard on a display for a user's review. The anonymized unstructured data 130 may be provided responsive to a request, responsive to a periodic delivery schedule, or some other form of delivery.

In some implementations, the server 106 can re-analyze the risk of disclosure of the anonymized unstructured data 130. The risk of disclosure in the anonymized unstructured data 130 may be re-analyzed to ensure it falls below a risk threshold value. Specifically, the server 106 can analyze the risk associated with detected Direct Identifiers, the average risk associated with detected quasi-identifiers, and a uniqueness risk for detected demographic identifiers. The server 106 may deem the anonymized unstructured data 130 as having "very small risk," meeting the standard for anonymity or de-identification under a particular regulation if each of the re-identification risks is below their respective acceptable threshold values. For example, the server 106 may utilize a process that can analyze multiple criteria to determine the risk associated with the anonymized unstructured data 130. In some examples, the server 106 can involve an expert that can manually review the data in the anonymized unstructured data 130 under various criteria to assess risk.

In some examples, the server 106 can utilize one or more pre-trained machine-learning models that can assess the risk of the anonymized unstructured data 130. The pre-trained machine learning model can be configured to analyze the anonymized unstructured data 130, score the analyzed anonymized unstructured data 130 reflecting an amount of risk, and output the score. In this example, the server 106 can compare the score to a threshold value. If the score satisfies the threshold value, e.g., falls below or is equivalent to, then the server 106 can deem the anonymized unstructured data 130 as "very low risk." Alternatively, if the score does not satisfy the threshold value, e.g., is above, then the server 106 may feedback the anonymized unstructured data 130 to the analyze risk 122 and transformation 124 in an attempt to minimize the overall score associated with risk.

FIG. 2A is a graphical diagram 200 that illustrates an example of anonymizing data according to measured disclosure risks. In the graphical diagram 200, the server 201 performs various processes to anonymize the unstructured data 202. The server 201 can anonymize the PII detected in unstructured data 202 and produce anonymized unstructured data 216.

The unstructured data 202 includes patient information relating to a patient ID 59810-6001824. The patient information includes, for example, the sex, the age, the weight, the height, the body mass index, a treatment start date, a treatment end date, a start date of an adverse event related to the treatment, an end date of adverse event related to the treatment, a reason for narrative, and intensity of the adverse event. The unstructured data 202 can also include medical history of the patient.

The server 201 can include a trained machine-learning model configured to detect specific attributes in the unstructured data 202 according to criteria 204. As illustrated in the graphical diagram 200, the server 210 can specify criteria 204 that includes patient identifier, age, and dates. The detection of these attributes can be imperfect, resulting in some instances of these attributes in the unstructured data that are not captured in detection, which can be accounted for at a later stage. Additionally, the trained machine-learning model can avoid detecting some attributes, for example related to sex, weight, height, BMI, and other specific criteria.

The server 201 can provide data indicative of the unstructured data 202 to the trained machine-learning model and the model can produce identifiers of the detected attributes. The identifiers can include, for example, (i) locations of detected attributes on the unstructured data 202 and (ii) confidence levels associated with the identifiers that indicates how likely the corresponding detected attribute represents an actual attribute according to the designated criteria. As illustrated in the graphical diagram 200, the trained machine-learning model detected the attributes 205-1, 205-2, 205-3, 205-4, 205-5, and 205-6. However, the server 201 can determine that the trained machine-learning model missed a particular detection in 206. Specifically, the trained machine-learning model missed the date related to an end date of the adverse event in 206.

Because of missing the date related to the end date of the adverse event, the server 201 can simulate the missed detection information in 208. For example, the server 201 can simulate the missed detection information to be "04JAN99". In response, the server 201 can apply the detected attributes 205-1 through 205-6 and the simulated attributes to the risk model in 210. The risk model can analyze the risk of disclosure of the detected attributes 205-1 through 205-6 and the simulated attributes. In response to determining the risk of disclosure, the server 201 can determine transformations or resynthesis to apply to the unstructured data 202 based on the determined risk, the detected attributes, and the simulated attributes in 212.

The transformations can include, for example, synthesis, masking, generalizing, suppressing, or other types of transformations. The server 201 can generate and apply transformations or resynthesis to ensure the detected attributes around the undetected attribute(s) are not overexposed. Said another way, the server 201 can apply transformations or resynthesis to the detected attributes to blend the undetected attributes with the transformed or resynthesized data such that the risk of disclosure for the undetected attributes is accounted for in the overall assessment, which can ultimately prevent the identification of the individual by an attacker.

In 214, the server 201 can inject the determined transformations or resynthesis into the unstructured data 202. As illustrated in the graphical diagram 200, the server 201 can inject the transformed or resynthesized data into the locations reflective of the detected attributes 205-1 through 205-6. For example, the unstructured data 216 can include the transformed or resynthesized data 215-1 through 215-6 at the locations of the detected attributes 205-1 through 205-6, respectively. Moreover, the undetected attribute 217 shown in the unstructured data 216 remains the same from the unstructured data 202. However, a subset of the transformed or resynthesized data, e.g., 215-3 through 215-5, have had their dates adjusted to blend the undetected attribute 217 to reduce the risk an attacker may identify the individual.

Figure 2B:
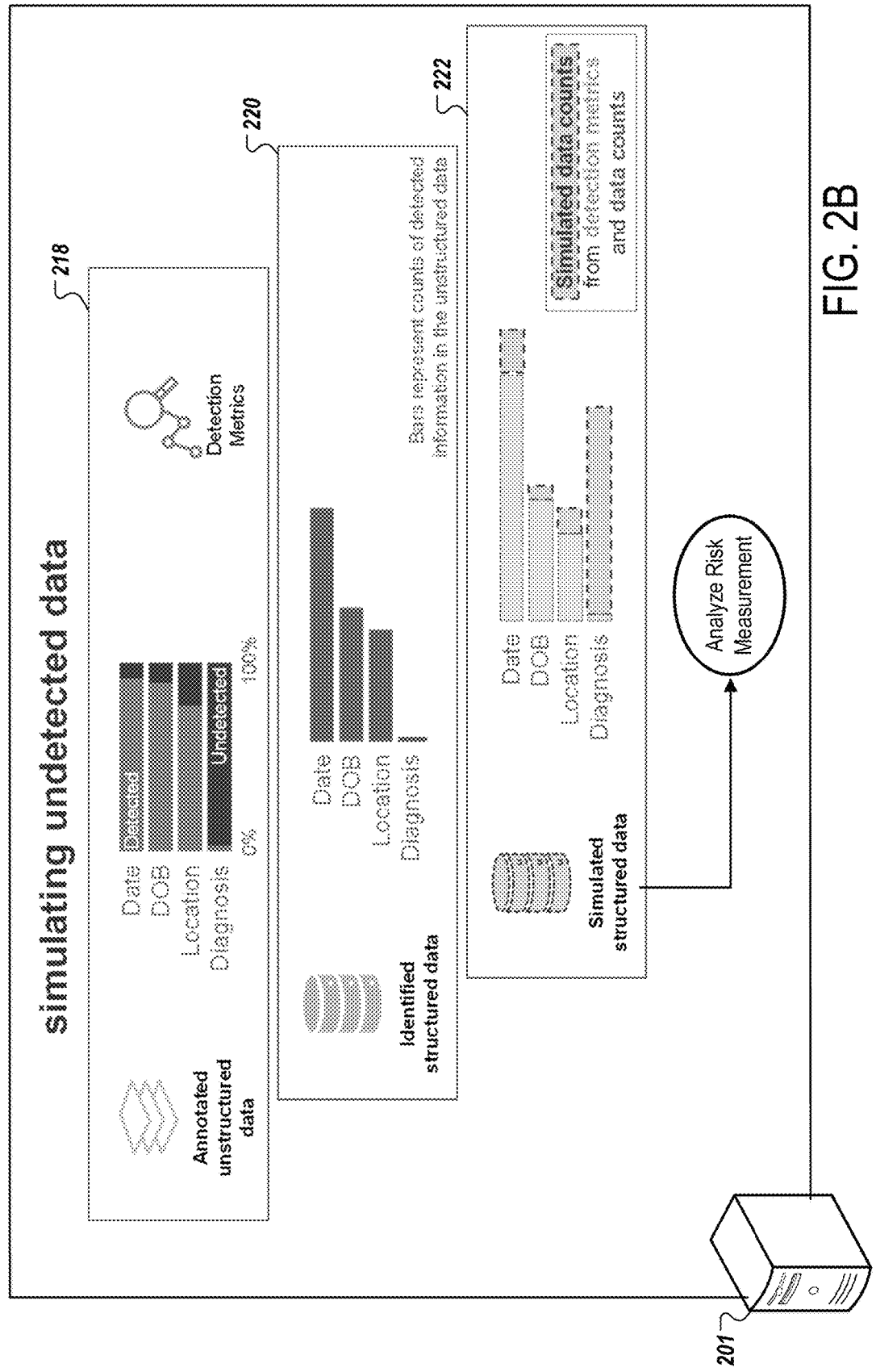
FIG. 2B is a graphical diagram for simulating an amount of undetected data from unstructured data.

FIG. 2B is a graphical diagram 207 for simulating an amount of undetected data from unstructured data. Specifically, the graphical diagram 207 illustrates blocks 218, 220, and 222. Block 218 illustrates an amount of attributes detected in the annotated unstructured data. For example, the attributes include date, date of birth, location, and diagnosis. The block 218 also reflects metrics associated with the attribute detections, e.g., amount of attributes detected, amount of attributes detected by type of attribute, etc.

In block 220, the server 201 can transform or resynthesize the annotated unstructured data to identified structured data based on the detected attributes. The block 220 illustrates bars associated with each detected attribute. The bars represent an amount or a count of detected information in the unstructured data for a respective attribute. For example, the server 201 detected 250 dates, 120 date of births, 90 locations, and 5 medical diagnoses.

In some implementations, the server 201 can analyze attributes that were missed during detection. The results of the attributes that the server 201 did not detect is illustrated in the dotted boxes in block 222. For example, the server 201 missed 20 dates, 5 date of births, 10 locations, and 200 medical diagnoses. In response, the server 201 can simulate the amount of data according to the amount of data that was not detected. In some examples, the server 201 can involve the use of a human operator to manually review the attributes that were missed during detection. Continuing with the example, the server 201 can simulate 20 dates, 5 date of births, 10 locations, and 200 medical diagnoses. In response, the server 201 can provide the detected attributes and the simulated attributes to a risk model to analyze the risk of disclosure of the attributes and to enable the server 201 to generate transformations or resynthesis to apply to the unstructured data.

Figure 3:
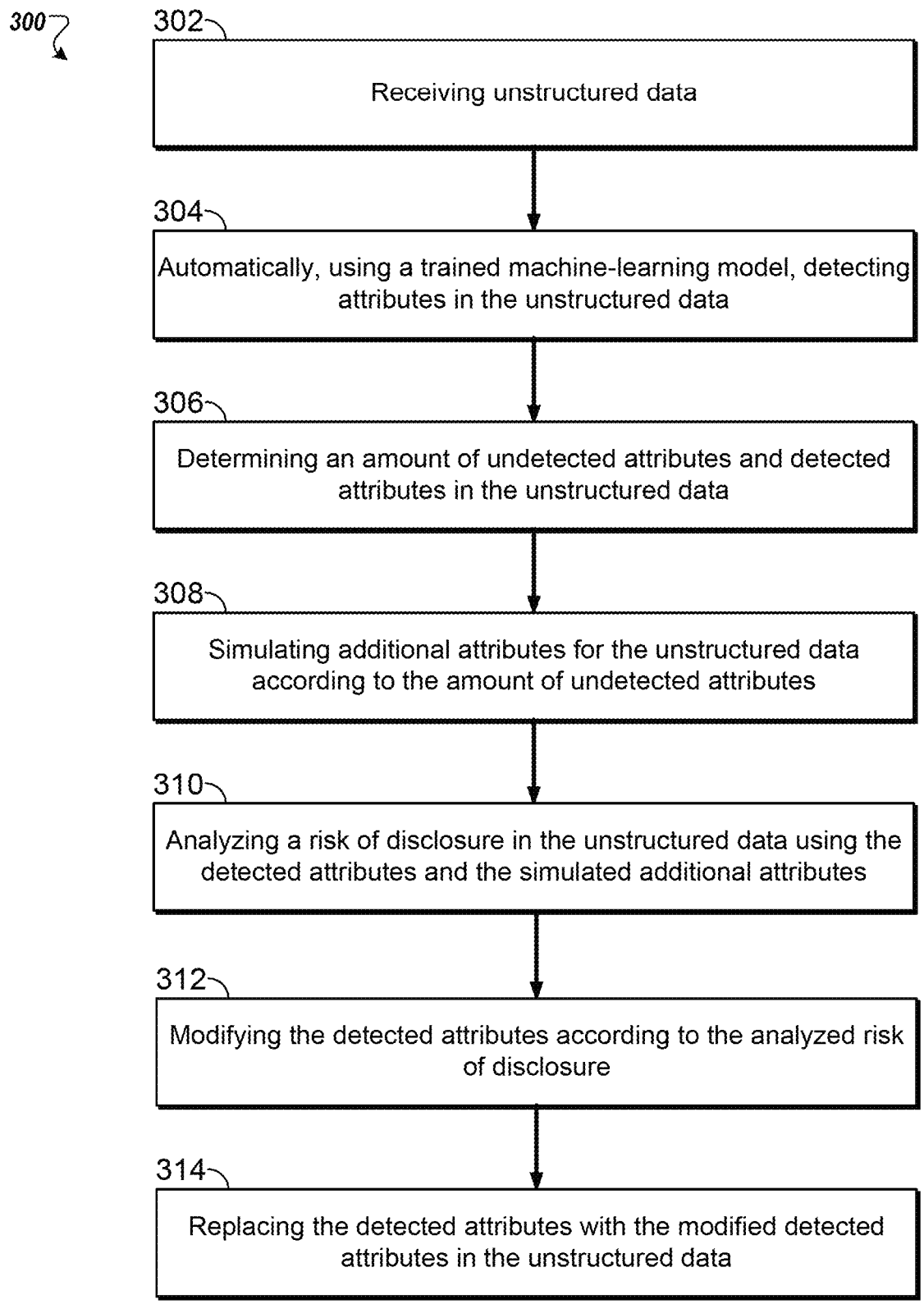
FIG. 3 is a flow diagram that illustrates an example process for generating anonymized data according to measured disclosure risks using one or more machine-learning models.

FIG. 3 is a flow diagram that illustrates an example process 300 for generating anonymized data according to measured disclosure risks using one or more machine-learning models. The process 300 can be performed by server 106 and server 201.

The server can receive unstructured data (302). The unstructured data can include various types of information that is not formalized such that its contents are straightforward to assess automatically. For example, the unstructured data can include text, documents, emails, images, videos, audios, medical records, datasets, emails, presentations, textbooks, brochures, websites, and other information. The unstructured data can be accessed from a database, provided by a user, or provided by a client device, to name some examples. In some examples, the unstructured data can a document and can include patient profile information that includes various fields and corresponding values.

The server can automatically detect attributes in the unstructured data using a trained machine-learning model (304). The server can generate a machine-learning model that is configured to detect the attributes in the unstructured data. The machine-learning model can be trained to detect attributes in a first subset of unstructured data. In response, the server can determine a number of undetected attributes in the training of the machine learning model. The server can retrain the machine-learning model to detect the attributes in the first subset of the unstructured data based on data indicative of the undetected attributes.

For example, the server can utilize a DistilBert model with a token classification layer on top of the hidden-states output for NER. The server can train the DistilBert model to detect entities, such as personally identifiable attributes. The machine-learning model, e.g., DistilBert model, can accept inputs of data indicative of the unstructured data, e.g., the unstructured data itself or address locations of where the unstructured data is stored for retrieval, and process the received unstructured data to identify attributes in the unstructured data.

The trained model can be configured to receive criteria for detection. The criteria can reflect the type of attributes for the model to detect and/or certain types of attributes for the model to not detect. The criteria can specify one or more of personal name, a date of birth, a personal identifier, an age, a location, a medical diagnosis, a relevant date, personal characteristics, and an address, to name some examples. Other examples are also possible. In this manner, the machine-learning model can be configured to detect any type of criteria presented in the unstructured data. In response to processing the unstructured data, the trained machine-learning model can produce unstructured data documents with annotations, e.g., silver standard unstructured documents.

The annotations can include data that identifies (i) locations of detected attributes on the unstructured data and includes (ii) confidence levels associated with the identifiers that indicates how likely the corresponding detected attribute represents an actual attribute according to the designated criteria. In some examples, the annotations can include metadata or tags for further identifying the detected attributes. The server can search through the identifiers and determine those whose confidence level satisfies a threshold value. For example, the server can retrieve identifiers whose confidence level, e.g., statistical value, meets or exceeds a threshold value of 85%. Any identifier whose confidence level does not satisfy the threshold value, which may be designated by a designer, is discarded. Any identifier whose confidence level satisfies the threshold value, e.g., exceeds or meets, is labeled as an identifier for the respective attribute. Other examples are also possible.

In some implementations, the machine learning model may exhibit inaccuracies in detecting attributes of the unstructured data. In order to enhance its detection capabilities, a human operator and/or the server can provide input and/or configuration to the process of manually reviewing the silver standard unstructured data and corresponding annotations. In response, the human operator and/or the server can label the miss-detected attributes in the silver standard unstructured data. The silver standard unstructured data with the miss-detected attributes can be labeled as gold standard unstructured data. The machine learning model may be further trained and refined with the gold standard unstructured data. Once further refined, the trained machine learning model maybe deployed and utilized in an application.

The deployed machine learning model can process a set of unstructured data. In response, the server can determine an amount of undetected attributes and detected attributes in the unstructured data (306). In some examples, a human operator can identify whether each detected attribute was accurately detected and determine the number of undetected attributes. In some examples, the server can identify a number of undetected attributes from the unstructured data. The server can determine a number of identifiers associated with the detected attributes labeled in the unstructured data and determine a number of undetected attributes in the unstructured data. In further detail, the server can determine a difference between (i) the number of identifiers associated with the detected attributes to (ii) a known number of detected attributes in the unstructured data. The known number of detected attributes can be based on, for example, a human reviewer, sample data, or data supplied by an external party.

In response to determining the difference between (i) the number of identifiers associated with the detected attributes to (ii) the known number of detected attributes in the unstructured data, the server can simulate the additional attributes according to the difference. In further detail, the server can simulate additional attributes for the unstructured data according to the amount of undetected attributes (308).

In some examples, the server can retrieve, from a storage device, a population distribution which is suppled as an external reference distribution or generated by detected attributes in the unstructured data. For each undetected attribute, the server can sample the population distribution for a sampled value, computing a sampling frequency according to the sampled value, and assign the sampling frequency as the additional attribute. In some examples, the server can simulate the additional attributes using other various processes, such as using a random seed, a counting method, an averaging method, or any other type of method to randomly select values that were not detected.

The server can analyze a risk of disclosure in the unstructured data using the detected attributes and the simulated additional attributes (310). In some examples, the server can, for each detected attribute, assign a first information value to a detected attribute according to samples retrieved from the population distribution. The server can retrieve, from an external storage device, another population distribution, the second population distribution being generated by attributes that change with respect to time. For each simulated additional attribute, the server can assign second information value to a simulated additional attribute according to samples retrieved from the second population distribution. In response, the server can aggregate, for each detected attribute and simulated additional attribute, the first information value and the second information value into an aggregated information value. Using at least one of the first information value, the second information value, the aggregated information value, and a size of a population associated with the unstructured data, the server can determine an anonymity value. The server can determine the risk of disclosure in the unstructured data using the determined anonymity value. Other methodologies and processes for determining risk are also possible.

The server can modify the detected attributes according to the analyzed risk of disclosure (312). In further detail, the server can determine a transformation approach for transforming or resynthesizing the detected attributes in the unstructured based on the analyzed risk of disclosure. The transformation or resynthesizing approach can be, for example, masking techniques, generalization techniques, and suppression techniques. Other examples are also possible. In some examples, the greater the risk score, e.g., compared to a threshold, the greater the amount of transformation or resynthesizing applied to the detected attributes. In some examples, the lower the risk score, e.g., compared to a threshold, the lower the amount of transformation or resynthesizing applied to the detected attributes.

In response to determining the transformation or resynthesizing approach, the server can transform or resynthesize the detected attributes in the unstructured data according to the determined transformation approach. In some examples, the transformations can include at least one of resynthesis, masking, generalizing, injecting noise, and imputing simulated values or noise. Other examples are also possible.

The server can replace the detected attributes with the modified detected attributes in the unstructured data (314). In some examples, the server can generate structured data that represents the detected attributes from the unstructured data using identifiers associated with the detected attributes in the unstructured data. In response, the server can apply the transformed or resynthesized attributes from the structured data to locations of the identifiers in the unstructured data. In some examples, the server can apply the transformed or resynthesized attributes by replacing the transformed or resynthesized attributes from the structured data to the locations of the detected attributes in the unstructured data.

In some implementations, the server can provide the anonymized unstructured data to various devices. Specifically, the server 106 can provide the anonymized unstructured data to, for example, a client device, a third party, a network attached storage, a database, memory, or other devices. In some examples, the server can provide data indicative of the anonymized unstructured data to a dashboard on a display for a user's review. The anonymized unstructured data can include the transformed or resynthesized attributes and any undetected attribute that was not transformed or resynthesized. Although the undetected attributes were not transformed or resynthesized, the server may deem the anonymized unstructured data as having very small or low risk due to meeting the standard for anonymization under a particular regulation.

Figure 4:
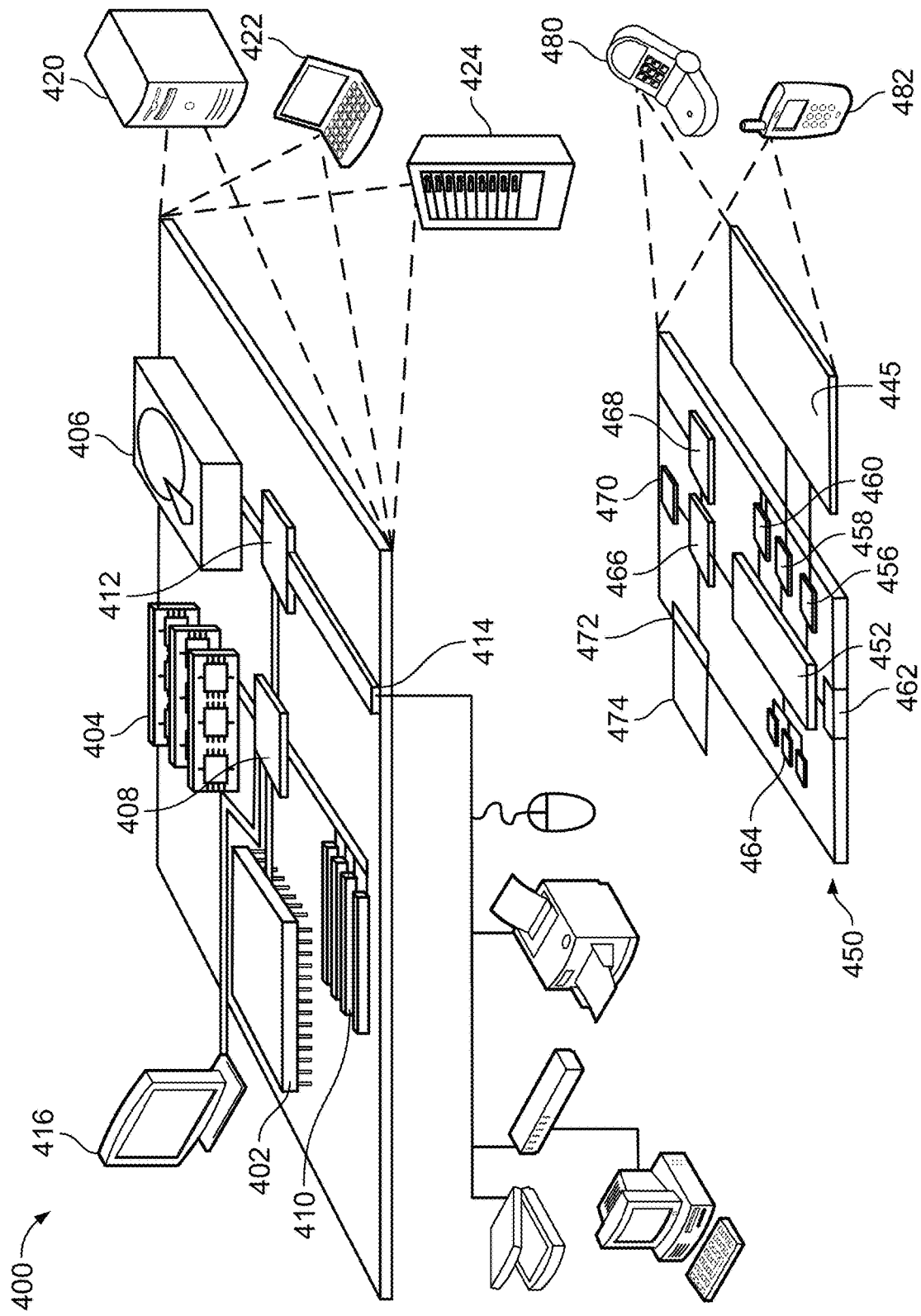
FIG. 4 is a block diagram of a computing system that can be used in connection with methods described in this document.

FIG. 4 is a block diagram of computing devices 400, 450 that may be used to implement the systems and methods described in this document, as either a client or as a server or multiple servers. Computing device 400 and 450 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low-speed interface 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed interface 408. In other implementations, multiple processors and/or multiple buses may be used, as appropriate, along with multiple memories and types of memory. In addition, multiple computing devices 400 may be connected, with each device providing portions of the necessary operations, e.g., as a server bank, a group of blade servers, or a multi-processor system.

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is exemplary only. In one implementation, the high-speed controller 408 is coupled to memory 404, display 416, e.g., through a graphics processor or accelerator, and to high-speed expansion ports 410, which may accept various expansion cards (not shown). In the implementation, low-speed controller 412 is coupled to storage device 406 and low-speed expansion port 414. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication, e.g., via a docking procedure, or for wireless communication, e.g., via Bluetooth or other such technologies.

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound, e.g., voice messages, music files, etc., and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method comprising:
    automatically, using a trained machine-learning model, detecting attributes in unstructured data;
    determining an amount of undetected attributes and detected attributes in the unstructured data;
    simulating additional attributes for the unstructured data according to the amount of undetected attributes, wherein the sampling comprises, for each undetected attribute:
        sampling a population distribution for a sampled value, wherein the population distribution is an externally supplied reference distribution;
        computing a sampling frequency according to the sampled value; and
        assigning the sampling frequency as an additional attribute;
    analyzing a risk of disclosure in the unstructured data using the detected attributes and the simulated additional attributes, wherein the analyzing comprises:
        assigning a first information value to each detected attribute according to samples received from a first statistical distribution used to simulate the additional attributes;
        assigning a second information value to each simulated additional attribute according to samples retrieved from a second statistical distribution, wherein the second statistical distribution is generated based on attributes that change with respect to time;

aggregating the first information value for each detected attribute and the second information value for each simulated additional attribute into an aggregated value;
determining an anonymity value using the first information value, the second information value, the aggregated value, and a size of a population associated with the unstructured data; and
determining the risk of disclosure in the unstructured data using the determined anonymity value;
modifying the detected attributes according to the analyzed risk of disclosure; and
replacing the detected attributes with the modified detected attributes in the unstructured data.

2. The computer-implemented method of claim 1, wherein the unstructured data comprise medical records, emails, presentations, textbooks, brochures, websites, documents, audio recordings, images, and videos.

3. The computer-implemented method of claim 1, further comprising:
generating a machine-learning model that is configured to detect the attributes in the unstructured data, wherein generating the machine-learning model comprises:
training the machine-learning model to detect the attributes in a first subset of the unstructured data;
determining a number of undetected attributes in the training of the machine-learning model; and
retraining the machine-learning model to detect the attributes in the first subset of the unstructured data based on data indicative of the undetected attributes.

4. The computer-implemented method of claim 3, further comprising:
determining the number of the undetected attributes in the first subset satisfies a threshold limit;
in response to determining the number of the undetected attributes satisfies the threshold limit, deploying the trained machine-learning model; and
detecting, by the trained machine-learning model, the attributes in a second subset of the unstructured data by providing the second subset as input to the trained machine-learning model, wherein the second subset of the unstructured data is different from the first subset of the unstructured data.

5. The computer-implemented method of claim 4, wherein detecting the attributes in the second subset of the unstructured data by providing the second subset as input to the trained machine-learning model further comprises:
for each detected attribute:
generating, by the trained machine-learning model, an identifier in the second subset of the unstructured data that represents (i) an identified location of the detected attribute and (ii) an indication of a detected attribute;
generating, by the trained machine-learning model, a confidence level associated with the identifier that indicates how likely a corresponding detected attribute represents an actual attribute according to criteria;
comparing the confidence level to a threshold level; and
in response to determining the confidence level satisfies the threshold level, labeling a portion of the unstructured data with the identifier at the identified location of the corresponding detected attribute.

6. The computer-implemented method of claim 1, wherein automatically detecting the attributes in the unstructured data further comprises:

receiving data specifying criteria associated with attributes to be detected in the unstructured data; and
receiving data specifying criteria associated with attributes not to be detected in the unstructured data.

7. The computer-implemented method of claim 6, wherein the criteria comprise a name, a date of birth, a personal identifier, an age, a location, a medical diagnosis, a relevant date, personal characteristics, and an address.

8. The computer-implemented method of claim 6, wherein determining the amount of undetected attributes and detected attributes in the unstructured data further comprises:
determining a number of identifiers associated with the detected attributes labeled in the unstructured data; and
determining a number of undetected attributes in the unstructured data, wherein determining the number of undetected attributes comprises:
determining a difference between (i) the number of identifiers associated with the detected attributes to (ii) a known number of detected attributes in the unstructured data, wherein the known number of detected attributes is supplied by an external party; and
in response to determining the difference between (i) the number of identifiers associated with the detected attributes to (ii) the known number of detected attributes in the unstructured data, simulating the additional attributes according to the difference.

9. The computer-implemented method of claim 1, wherein simulating the additional attributes for the unstructured data according to the amount of undetected attributes comprises simulating the additional attributes for the unstructured data using a random seed, a counting method, and an averaging method.

10. The computer-implemented method of claim 1, wherein simulating the additional attributes for the unstructured data according to the amount of undetected attributes comprises simulating the additional attributes for the unstructured data according to the amount of the undetected attributes the trained machine-learning model missed during processing of the unstructured data.

11. The computer-implemented method of claim 1, wherein modifying the detected attributes in the unstructured data according to the analyzed risk of disclosure further comprises:
determining a transformation approach for transforming the detected attributes in the unstructured data based on the analyzed risk of disclosure; and
transforming the detected attributes in the unstructured data according to the determined transformation approach, wherein the transformations comprise at least one of resynthesis, masking, generalizing, injecting noise, and imputing simulated values.

12. The computer-implemented method of claim 11, wherein replacing the detected attributes with the modified detected attributes in the unstructured data further comprises:
generating structured data that represents the detected attributes from the unstructured data using identifiers associated with the detected attributes in the unstructured data; and
applying the transformed attributes from the structured data to locations of the identifiers in the unstructured data, wherein applying the transformed attributes replace the detected attributes from the unstructured data.

13. The computer-implemented method of claim 1, further comprising providing, to an external party, the unstructured data that comprises the modified detected attributes and the undetected attributes.

14. A system comprising:
one or more computers and one or more storage devices storing instructions that are operable, when executed by the one or more computers, to cause the one or more computers to perform operations comprising:
automatically, using a trained machine-learning model, detecting attributes in unstructured data;
determining an amount of undetected attributes and detected attributes in the unstructured data;
simulating additional attributes for the unstructured data according to the amount of undetected attributes, wherein the sampling comprises, for each undetected attribute:
sampling a population distribution for a sampled value, wherein the population distribution is an externally supplied reference distribution;
computing a sampling frequency according to the sampled value; and
assigning the sampling frequency as an additional attribute;
analyzing a risk of disclosure in the unstructured data using the detected attributes and the simulated additional attributes, wherein the analyzing comprises:
assigning a first information value to each detected attribute according to samples received from a first statistical distribution used to simulate the additional attributes;
assigning a second information value to each simulated additional attribute according to samples retrieved from a second statistical distribution, wherein the second statistical distribution is generated based on attributes that change with respect to time;
aggregating, for each detected attribute and simulated additional attribute, the first information value and the second information value into an aggregated value;
determining an anonymity value using the first information value, the second information value, the aggregated information value, and a size of a population associated with the unstructured data; and
determining the risk of disclosure in the unstructured data using the determined anonymity value;
modifying the detected attributes according to the analyzed risk of disclosure; and
replacing the detected attributes with the modified detected attributes in the unstructured data.

15. The system of claim 14, wherein the unstructured data comprise medical records, emails, presentations, textbooks, brochures, websites, documents, audio recordings, images, and videos.

16. The system of claim 14, further comprising:
generating a machine-learning model that is configured to detect the attributes in the unstructured data, wherein generating the machine-learning model comprises:
training the machine-learning model to detect the attributes in a first subset of the unstructured data;
determining a number of undetected attributes in the training of the machine-learning model; and
retraining the machine-learning model to detect the attributes in the first subset of the unstructured data based on data indicative of the undetected attributes.

17. The system of claim 16, further comprising:
determining the number of the undetected attributes in the first subset satisfies a threshold limit;
in response to determining the number of the undetected attributes satisfies the threshold limit, deploying the trained machine-learning model; and
detecting, by the trained machine-learning model, the attributes in a second subset of the unstructured data by providing the second subset as input to the trained machine-learning model, wherein the second subset of the unstructured data is different from the first subset of the unstructured data.

18. The system of claim 17, wherein detecting the attributes in the second subset of the unstructured data by providing the second subset as input to the trained machine-learning model further comprises:
for each detected attribute:
generating, by the trained machine-learning model, an identifier in the second subset of the unstructured data that represents (i) an identified location of the detected attribute and (ii) an indication of a detected attribute;
generating, by the trained machine-learning model, a confidence level associated with the identifier that indicates how likely a corresponding detected attribute represents an actual attribute according to criteria;
comparing the confidence level to a threshold level; and
in response to determining the confidence level satisfies the threshold level, labeling a portion of the unstructured data with the identifier at the identified location of the corresponding detected attribute.

19. The system of claim 14, wherein automatically detecting the attributes in the unstructured data further comprises:
receiving data specifying criteria associated with attributes to be detected in the unstructured data; and
receiving data specifying criteria associated with attributes not to be detected in the unstructured data.

20. A non-transitory computer-readable medium storing software comprising instructions executable by one or more computers which, upon such execution, cause the one or more computers to perform operations comprising:
automatically, using a trained machine-learning model, detecting attributes in unstructured data;
determining an amount of undetected attributes and detected attributes in the unstructured data;
simulating additional attributes for the unstructured data according to the amount of undetected attributes, wherein the sampling comprises, for each undetected attribute:
sampling a population distribution for a sampled value, wherein the population distribution is an externally supplied reference distribution;
computing a sampling frequency according to the sampled value; and
assigning the sampling frequency as an additional attribute;
analyzing a risk of disclosure in the unstructured data using the detected attributes and the simulated additional attributes, wherein the analyzing comprises:
assigning a first information value to each detected attribute according to samples received from a first statistical distribution used to simulate the additional attributes;
assigning a second information value to each simulated additional attribute according to samples retrieved from a second statistical distribution, wherein the second statistical distribution is generated based on attributes that change with respect to time;

aggregating, for each detected attribute and simulated additional attribute, the first information value and the second information value into an aggregated value;

determining an anonymity value using the first information value, the second information value, the aggregated information value, and a size of a population associated with the unstructured data; and determining the risk of disclosure in the unstructured data using the determined anonymity value;

modifying the detected attributes according to the analyzed risk of disclosure; and replacing the detected attributes with the modified detected attributes in the unstructured data.

* * * * *